(12) United States Patent
Leonard et al.

(10) Patent No.: US 11,361,454 B2
(45) Date of Patent: Jun. 14, 2022

(54) ALIGNMENT FOR WAFER IMAGES

(71) Applicant: Wolfspeed, Inc., Durham, NC (US)

(72) Inventors: Robert Tyler Leonard, Raleigh, NC (US); Matthew David Conrad, Durham, NC (US); Edward Robert Van Brunt, Raleigh, NC (US)

(73) Assignee: WOLFSPEED, INC., Durham, NC (US)

( * ) Notice: Subject to any disclaimer, the term of this patent is extended or adjusted under 35 U.S.C. 154(b) by 0 days.

(21) Appl. No.: 16/804,776

(22) Filed: Feb. 28, 2020

(65) Prior Publication Data

US 2021/0272298 A1    Sep. 2, 2021

(51) Int. Cl.
*G06T 7/33* (2017.01)
*G06T 3/00* (2006.01)

(52) U.S. Cl.
CPC .......... *G06T 7/337* (2017.01); *G06T 3/0068* (2013.01); *G06T 2207/30148* (2013.01)

(58) Field of Classification Search
CPC ................ G06T 7/337; G06T 3/0068; G06T 2207/30148
See application file for complete search history.

(56) References Cited

U.S. PATENT DOCUMENTS

| | | | | |
|---|---|---|---|---|
| 4,470,875 A * | 9/1984 | Poteat | ............... | H01L 21/30608 252/79.5 |
| 6,457,811 B1 * | 10/2002 | Pan | ..................... | B41J 2/14016 347/49 |
| 6,977,986 B1 * | 12/2005 | Beanland | ............... | G01N 23/20 378/34 |
| 7,314,766 B2 * | 1/2008 | Sugamoto | ............... | H01L 22/24 257/E21.527 |
| 9,865,046 B2 * | 1/2018 | Urano | ....................... | G06T 7/33 |
| 2004/0071262 A1 * | 4/2004 | Beanland | .............. | G03F 9/7003 378/73 |

(Continued)

OTHER PUBLICATIONS

Berwian, P., et al., "Imaging Defect Luminescence of 4H-SiC by Ultraviolet-Photoluminescence," Solid State Phenomena, vol. 242, 2015, Trans Tech Publications, pp. 484-489.

(Continued)

*Primary Examiner* — John B Strege
(74) *Attorney, Agent, or Firm* — Withrow & Terranova, P.L.L.C.

(57) ABSTRACT

Wafer images and related alignment methods for crystalline wafers are disclosed. Certain aspects relate to accessing and aligning images of a same or similar crystalline wafer captured from different imaging sources. Alignment may include determining spatial differences between shared crystalline features in various wafer images of the same or similar crystalline wafer and transforming at least one of the images according to the determined spatial differences. With sufficient alignment, information may be associated and/or transferred between the various images, thereby providing the capability of forming a combined wafer image and sub-images thereof with high resolution and spatial coordination between different image sources. Certain aspects relate to development of nondestructive, high fidelity defect characterization and/or dislocation counting methods in crystalline materials based on modern deep convolutional neural networks (DCNN).

42 Claims, 9 Drawing Sheets

(56) References Cited

U.S. PATENT DOCUMENTS

| | | | | |
|---|---|---|---|---|
| 2004/0213376 | A1* | 10/2004 | Aydelott | G01N 23/20 |
| | | | | 378/73 |
| 2009/0250791 | A1* | 10/2009 | Afentakis | H01L 29/66757 |
| | | | | 257/618 |
| 2010/0142800 | A1* | 6/2010 | Tung-Sing Pak | G06T 7/001 |
| | | | | 382/149 |
| 2014/0268121 | A1* | 9/2014 | Gastaldo | G01N 21/94 |
| | | | | 356/237.5 |
| 2018/0211376 | A1* | 7/2018 | Bedell | H01J 37/292 |
| 2021/0296433 | A1* | 9/2021 | Noguchi | H01L 22/12 |

OTHER PUBLICATIONS

Chen, L-C., et al., "DeepLab: Semantic Image Segmentation with Deep Convolutional Nets, Atrous Convolution, and Fully Connected CRFs," IEEE Transactions on Pattern Analysis and Machine Intelligence, 2017, IEEE, 14 pages.

Cree, "Cree to Invest $1 Billion to Expand Silicon Carbide Capacity," https://www.cree.com/news-events/news/article/cree-to-invest-1-billion-to-expand-silicon-carbide-capacity. May 7, 2019, 3 pages.

Cree, "Cree Selected as Silicon Carbide Partner for the Volkswagen Group FAST Program," https://www.cree.com/news-events/news/article/cree-selected-as-silicon-carbide-partner-for-the-volkswagen-group-fast-program, May 14, 2019, 3 pages.

Hoseini, F., et al., "An Efficient Implementation of Deep Convolutional Neural Networks for MRI Segmentation," Journal of Digital Imaging, https://doi.org/10.1007/s10278-018-0062-2, Feb. 27, 2018, Society for Imaging Informatics in Medicine 2018, 10 page.

Isola, P., et al., "Image-to-Image Translation with Conditional Adversarial Networks," 2017 IEEE Conference on Computer Vision and Pattern Recognition (CVPR), 2017, Honolulu, Hawaii, IEEE, 17 pages.

Jégou, S., et al., "The One Hundred Layers Tiramisu: Fully Convolutional DenseNets for Semantic Segmentation," 2017 IEEE Conference on Computer Vision and Pattern Recognition Workshops (CVPRW), 2017, Honolulu, Hawaii, IEEE, 9 pages.

Kadhim, M. A., et al., "Convolutional Neural Network for Satellite Image Classification," Studies in Computational Intelligence, vol. 830, 2020, Springer Nature Switzerland, pp. 165-178.

Kawahara, C., et al., "Identification of dislocations in 4H-SiC epitaxial layers and substrates using photoluminescence imaging," Japanese Journal of Applied Physics, vol. 53, 2014, The Japan Society of Applied Physics, 3 pages.

Leonard, R. T., "Exploration of Bulk and Epitaxy Defects in 4H-SiC Using Large Scale Optical Characterization," Materials Science Forum, vol. 897, 2017, Trans Tech Publications, 4 pages.

Ronneberger, O., et al., "U-Net: Convolutional Networks for Biomedical Image Segmentation," Lecture Notes in Computer Science, vol. 9351, 2015, Springer, 8 pages.

Stahlbush, R. E., "Whole-Wafer Mapping of Dislocations in 4H-SiC Epitaxy," Materials Science Forum, vols. 556-557, 2007, Trans Tech Publications, 6 pages.

Sumakeris, J. J., et al., "Dislocation Characterization in 4H-SiC Crystals," Materials Science Forum, vol. 858, 2016, Trans Tech Publications, 5 pages.

Szegedy, C., et al., "Going deeper with convolutions," EEE Conference on Computer Vision and Pattern Recognition (CVPR), Boston, Maine, 2015, IEEE, 12 page.

Tajima, M., et al., "Characterization of SiC Wafers by Photoluminescence Mapping," Materials Science Forum, vols. 527-529, 2006, Trans Tech Publications, 7 pages.

Van Brunt, E., "Performance and Reliability Impacts of Extended Epitaxial Defects on 4H-SiC Power Devices," Materials Science Forum, vol. 924, 2018, Trans Tech Publications, 6 pages.

Feng, Gan, et al., "Nonradiative recombination at threading dislocations in 4H-SiC epilayers studied by micro-photoluminescence mapping," Journal of Applied Physics, vol. 110, Issue 3, Aug. 2011, American Institute of Physics, 5 pages.

Nagano, Masahiro, et al., "Plan-View and Cross-Sectional Photoluminescence Imaging Analyses of Threading Dislocations in 4H-SiC Epilayers," Japanese Journal of Applied Physics, vol. 52, Issue 04CP09, 2013, Japan Society of Applied Physics, 5 pages.

Tajima, M., et al., "Nondestructive characterization of dislocations and micropipes in high-resistivity 6H-SiC wafers by deep-level photoluminescence mapping," Applied Physics Letters, vol. 86, Issue 6, Feb. 2005, AIP Publishing, 3 pages.

International Search Report and Written Opinion for International Patent Application No. PCT/US2020/032313, dated Oct. 2, 2020, 24 pages.

Invitation to Pay Additional Fees and Partial Search for International Patent Application No. PCT/US2020/032313, mailed Aug. 11, 2020, 23 pages.

* cited by examiner

ALIGNMENT FOR WAFER IMAGES

FIELD OF THE DISCLOSURE

The present disclosure relates to wafer images and related alignment methods, and more specifically to wafer images and related alignment methods for crystalline wafers.

BACKGROUND

The continuing advancement of state of the art high quality crystalline material substrates or wafers (e.g., silicon carbide (SiC) substrates or wafers) for increased device yields and manufacturing efficiency requires continual reduction in crystal defects and continual increases in wafer sizes. SiC exhibits many attractive electrical and thermophysical properties. SiC is especially useful due to its physical strength and high resistance to chemical attack as well as various electronic properties, including radiation hardness, high breakdown field, a relatively wide band gap, high saturated electron drift velocity, high temperature operation, and absorption and emission of high energy photons in the blue, violet, and ultraviolet (UV) regions of the electromagnetic spectrum. Compared with conventional wafer or substrate materials, including silicon (Si) and sapphire, such properties of SiC make it more suitable for the fabrication of wafers or substrates for high power density and high frequency solid state devices, such as power electronic, radio frequency (RF), and optoelectronic devices.

Continuous development has led to a level of maturity in the fabrication of SiC wafers that allows such semiconductor devices to be manufactured for increasingly widespread commercial applications. The use of SiC accelerates the automotive industry's transformation to electric vehicles, enabling greater system efficiencies, while reducing cost, lowering weight and conserving space. This transformation is driven by improving the quality and size of commercially available SiC wafers. Increased device yields and manufacturing efficiency require continual reduction in extended defects.

As the semiconductor device industry continues to mature, SiC wafers having larger usable diameters are desired. Usable diameters of SiC wafers can be limited by certain structural defects in the material composition of SiC, such as dislocations (e.g., micropipes, threading edge, threading screw and/or basal plane dislocations), hexagonal voids, and stacking faults, among others. Accurate defect characterization is essential for feedback to crystal growth technology and to provide reliable information to customers.

The art continues to seek improved defect characterization techniques for crystalline materials that are capable of overcoming challenges associated with conventional techniques.

SUMMARY

Wafer images and related alignment methods for crystalline wafers are disclosed. Certain aspects relate to accessing and aligning images of a same or similar crystalline wafer captured from different imaging sources. Alignment may include determining spatial differences between common crystalline features in various wafer images of the same or similar crystalline wafer and transforming at least one of the images according to the determined spatial differences. In various applications, different imaging sources may each provide identification of certain crystalline features that are not clearly obtained from other imaging sources. With sufficient alignment, information may be associated and/or transferred between the various images, thereby providing the capability of forming a combined wafer image and sub-images thereof with high resolution and spatial coordination between different image sources. Certain aspects relate to development of nondestructive, high fidelity defect characterization and/or dislocation counting methods in crystalline materials based on modern deep convolutional neural networks (DCNN).

In one aspect, a method of aligning wafer images comprises: accessing a first wafer image and a second wafer image; identifying a plurality of common crystalline features that is present in both the first wafer image and the second wafer image; assigning a first coordinate position for each common crystalline feature of the plurality of common crystalline features in the first wafer image; assigning a second coordinate position for each common crystalline feature of the plurality of common crystalline features in the second wafer image; and aligning the first wafer image with the second wafer image so that the first coordinate position and the second coordinate position for each common crystalline feature of the plurality of common crystalline features are positioned less than or equal to 15 microns ($\mu$m) from each other.

In certain embodiments, the first coordinate position and the second coordinate position for each common crystalline feature of the plurality of common crystalline features are positioned less than or equal to 10 $\mu$m from each other. In certain embodiments, the first coordinate position and the second coordinate position for each common crystalline feature of the plurality of common crystalline features are positioned less than or equal to 3 $\mu$m from each other. In certain embodiments, the first coordinate position and the second coordinate position for each common crystalline feature of the plurality of common crystalline features are positioned in a range including 1 $\mu$m and 15 $\mu$m from each another.

In certain embodiments, aligning the first wafer image and the second wafer image comprises determining a transformation matrix based on differences in coordinate positions between the first coordinate position and the second coordinate position for each common crystalline feature of the plurality of common crystalline features. In certain embodiments, the method further comprises applying the transformation matrix to the first coordinate position to provide a transformed first coordinate position for each common crystalline feature of the plurality of common crystalline features. In certain embodiments, the method further comprises training a deep neural network (DNN) based on the transformed first coordinate position relative to the second coordinate position.

In certain embodiments, the first wafer image and the second wafer image are captured from a same crystalline wafer. In certain embodiments, the same crystalline wafer comprises a silicon carbide (SiC) wafer. In certain embodiments, the first wafer image is captured from a silicon face of the SiC wafer and the second wafer image is captured from a carbon face of the SiC wafer. In certain embodiments, the plurality of common crystalline features comprises at least one of micropipes, threading edge dislocations, threading screw dislocations, basal plane dislocations, hexagonal voids, or stacking faults. In certain embodiments, the first wafer image and the second wafer image are taken from different wafers that were formed from a same crystalline boule. In certain embodiments, the same crystalline boule comprises SiC. In certain embodiments, the first wafer image comprises one of a photoluminescence (PL) image, an optical microscopy image, a cross-polarized light image, or an x-ray topography image. In certain embodiments, the second wafer image comprises one of a PL image, an optical microscopy image, a cross-polarized light image, or an x-ray topography image that is different than the first wafer image. In certain embodiments, the first wafer image is a nondestructive image and the second wafer image is a destructive image. In certain embodiments, the first wafer image is a destructive image and the second wafer image is a destructive image. In certain embodiments, at least one of the first wafer image and the second wafer image comprises spatially correlated data that is provided by a model or mathematical calculation.

In another aspect, a method of aligning wafer images comprises: accessing a first wafer image and a second wafer image; identifying a plurality of common crystalline features that is present in both the first wafer image and the second wafer image; assigning a first pixel group for each common crystalline feature of the plurality of common crystalline features in the first wafer image, wherein each individual pixel of the first pixel group includes at least a portion of a common crystalline feature of the plurality of common crystalline features in the first wafer image; assigning a second pixel group for each common crystalline feature of the plurality of common crystalline features in the second wafer image, wherein each individual pixel of the second pixel group includes at least a portion of a common crystalline feature of the plurality of crystalline features in the second wafer image; and aligning the first wafer image with the second wafer image so that the first pixel group at least partially overlaps with the second pixel group for each common crystalline feature of the plurality of common crystalline features.

In certain embodiments, each common crystalline feature of the plurality of common crystalline features comprises a width of less than or equal to μm. In certain embodiments, the width is less than or equal to 10 μm. In certain embodiments, the width is less than or equal to 3 μm. In certain embodiments, the width is in a range including 1 μm and 25 μm. In certain embodiments, a pixel size of each individual pixel in the first pixel group is in a range including 3 μm and 10 μm.

In certain embodiments, the method further comprises: identifying a first subsection of the first wafer image and a second subsection of the second wafer image that both comprise a first common crystalline feature of the plurality of common crystalline features; assigning a first coordinate position of the first common crystalline feature in the first subsection; and assigning a second coordinate position of the first common crystalline feature in the second subsection. In certain embodiments, the method further comprises transforming the first coordinate position to correspond with the second coordinate position.

In certain embodiments, the method further comprises: identifying a plurality of first subsections of the first wafer image and a plurality of second subsections of the second wafer image; grouping the plurality of first subsections and the plurality of second subsections into a plurality of subsection pairs, wherein each subsection pair comprises an individual first subsection of the plurality of first subsections, an individual second subsection of the plurality of second subsections, and at least one common crystalline feature of the plurality of common crystalline features; and determining a transformation matrix based on differences in coordinate positions for the at least one common crystalline feature within each subsection pair of the plurality of subsection pairs.

In certain embodiments, the method further comprises applying the transformation matrix so that the at least one common crystalline feature within each subsection pair is at least partially aligned. In certain embodiments, the method further comprises providing a combined wafer image based on where the first wafer image is at least partially aligned with the second wafer image based on the transformation matrix. In certain embodiments, the method further comprises providing the combined wafer image to a DNN. In certain embodiments, the first wafer image and the second wafer image are captured from either a same crystalline wafer or from different wafers that were formed from a same crystalline boule. In certain embodiments, the same crystalline wafer or the same crystalline boule comprises SiC. In certain embodiments, the plurality of common crystalline features comprises at least one of micropipes, threading edge dislocations, threading screw dislocations, basal plane dislocations, hexagonal voids, or stacking faults. In certain embodiments, the first wafer image is captured from a silicon face of a first SiC wafer and the second wafer image is captured from a carbon face of the first SiC wafer or a carbon face of a second SiC wafer formed from a same crystalline boule as the first SiC wafer. In certain embodiments, the first wafer image comprises one of a PL image, an optical microscopy image, a cross-polarized light image, or an x-ray topography image. In certain embodiments, the second wafer image comprises one of a PL image, an optical microscopy image, a cross-polarized light image, or an x-ray topography image that is different than the first wafer image. In certain embodiments, the first wafer image is a nondestructive image and the second wafer image is a destructive image. In certain embodiments, the first wafer image is a destructive image and the second wafer image is a nondestructive image.

In another aspect, any of the foregoing aspects individually or together, and/or various separate aspects and features as described herein, may be combined for additional advantage. Any of the various features and elements as disclosed herein may be combined with one or more other disclosed features and elements unless indicated to the contrary herein.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

DETAILED DESCRIPTION

Figure 1A:
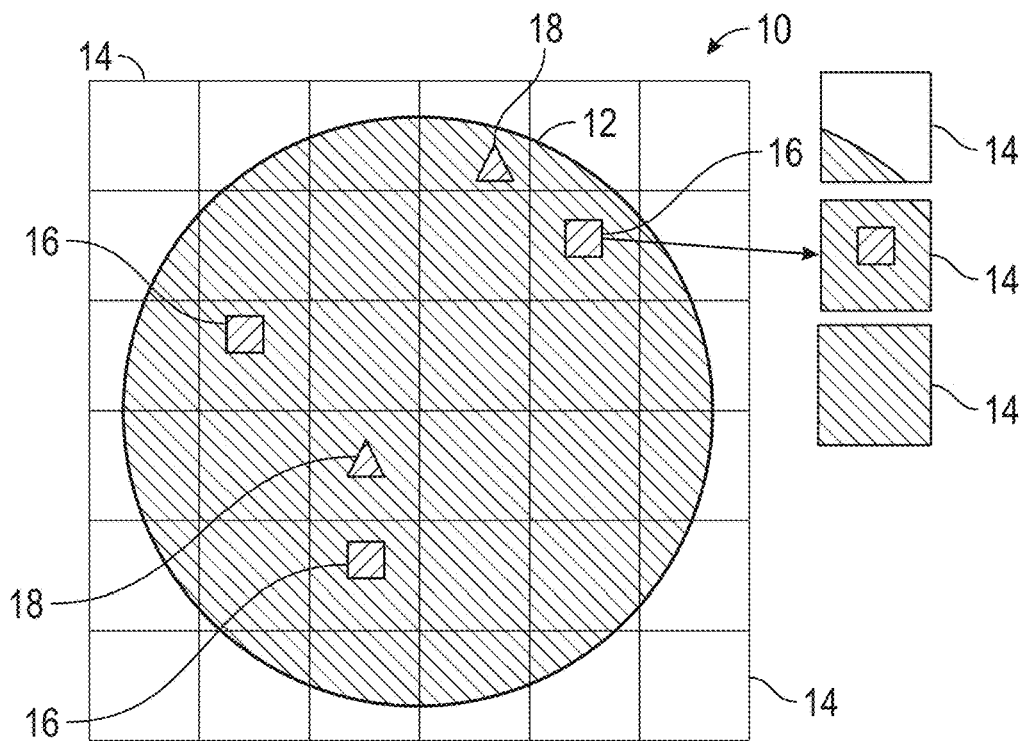
FIG. 1A is an illustration of a first wafer image that is captured by an imaging source for crystalline materials.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Embodiments are described herein with reference to figures that are provided as schematic illustrations of various embodiments of the disclosure. As such, the actual thickness of the layers or elements can be different, and variations from the shapes of the illustrations as a result, for example, of manufacturing techniques and/or tolerances, are expected. For example, a region illustrated or described as square or rectangular can have rounded or curved features, and regions shown as straight lines may have some irregularity. Thus, the regions illustrated in the figures are schematic and their shapes are not intended to exclusively illustrate the precise shape of a region of a device and are not intended to limit the scope of the disclosure. Common elements between figures may be shown herein with common element numbers and may not be subsequently re-described.

Wafer images and related alignment methods for crystalline wafers are disclosed. Certain aspects relate to accessing and aligning images of a same or similar crystalline wafer captured from different imaging sources. Alignment may include determining spatial differences between common crystalline features in various wafer images of the same or similar crystalline wafer and transforming at least one of the images according to the determined spatial differences. In various applications, different imaging sources may each provide identification of certain crystalline features that are not clearly obtained from other imaging sources. With sufficient alignment, information may be associated and/or transferred between the various images, thereby providing the capability of forming a combined wafer image and sub-images thereof with high resolution and spatial coordination between different image sources. Certain aspects relate to development of nondestructive, high fidelity defect characterization and/or dislocation counting methods in crystalline materials based on modern deep convolutional neural networks (DCNN).

As used herein, a "substrate" refers to a crystalline material, such as a single crystal semiconductor material. In certain embodiments, a substrate may have sufficient thickness (i) to be surface processed (e.g., lapped and polished) to support epitaxial deposition of one or more semiconductor material layers, and optionally (ii) to be free-standing if and when separated from a rigid carrier. In certain embodiments, the terms "substrate" and "wafer" may be used interchangeably as a wafer is typically used as a substrate for semiconductor devices that may be formed thereon. As such, a substrate or a wafer may refer to free-standing crystalline material that has been separated from a larger or bulk crystalline material or substrate. In certain embodiments, a wafer may have a generally cylindrical or circular shape, and/or may have a thickness of at least about one or more of the following thicknesses: 100 microns (μm), 200 μm, 300 μm, 350 μm, 500 μm, 750 μm, 1 millimeter (mm), 2 mm, 3 mm, 5 mm, 1 centimeter (cm), 2 cm, 5 cm, 10 cm, 20 cm, 30 cm, or more. In certain embodiments, the thickness may include any number of ranges that include different combinations of the values listed above. For example, the thickness may be provided in a range including 200 μm to 300 μm, or 200 μm to 350 μm, or 200 μm to 500 μm, or 200 μm to 750 μm, or 200 μm to 1 mm, and so on. In this regard, different thickness ranges may be provided that begin with each value listed above and end with all possible higher values listed above.

In certain embodiments, a wafer may include a thicker wafer that is divisible into two thinner wafers. In certain embodiments, a wafer may be part of a thicker wafer having one or more epitaxial layers (optionally in conjunction with one or more metal contacts) arranged thereon as part of a device wafer with a plurality of electrically operative devices. The device wafer may be divided to yield a thinner device wafer and a second thinner wafer on which one or more epitaxial layers (optionally in conjunction with one or more metal contacts) may be subsequently formed.

In certain embodiments, a wafer may comprise a diameter of approximately 100 mm or greater, approximately 150 mm or greater, or approximately 200 mm or greater, or approximately 300 mm or greater, or approximately 450 mm or greater, or in a range including approximately 100 mm to approximately 450 mm, or in a range including approximately 150 mm to approximately 450 mm, or in a range including approximately 150 mm to approximately 300 mm, or in a range including approximately 200 mm to approximately 300 mm. With regard to relative dimensions, the term "approximately" is defined to mean a nominal dimension within a certain tolerance, such as plus or minus 5 mm from a diameter dimension. For example, as used herein, a wafer with a "200 mm" diameter may encompass a diameter range including 195 mm to 205 mm, a wafer with a "300 mm" diameter may encompass a diameter range including 295 mm to 305 mm, and a wafer with a "450 mm" diameter may encompass a diameter range including 445 mm to 455 mm. In further embodiments, such tolerances may be smaller, such as plus or minus 1 mm, or plus or minus 0.25 mm.

Methods disclosed herein may be applied to substrates or wafers of various crystalline materials, of both single crystal and polycrystalline varieties. In certain embodiments, methods disclosed herein may utilize cubic, hexagonal, and other crystal structures, and may be directed to crystalline materials having on-axis and off-axis crystallographic orientations. In certain embodiments, methods disclosed herein may be applied to semiconductor materials and/or wide bandgap materials. Exemplary materials include, but are not limited to, silicon carbide (SiC), silicon (Si), gallium arsenide (GaAs), sapphire, and diamond. In certain embodiments, such methods may utilize single crystal semiconductor materials having a hexagonal crystal structure, such as 4H-SiC, 6H-SiC, or Group III nitride materials (e.g., gallium nitride (GaN), aluminum nitride (AlN), indium nitride (InN), indium gallium nitride (InGaN), aluminum gallium nitride (AlGaN), or aluminum indium gallium nitride (AlInGaN)). In certain embodiments, a substrate or wafer may comprise 4H-SiC with a diameter of approximately 100 mm, 150 mm, 200 mm, 300 mm or greater, and a thickness in a range of 100 μm to 1000 μm, or in a range of 100 μm to 800 μm, or in a range of 100 μm to 600 μm, or in a range of 150 μm to 500 μm, or in a range of 150 μm to 400 μm, or in a range of 200 μm to 500 μm, or in any other thickness range or having any other thickness value specified herein. In this regard, different thickness ranges may be provided that begin with each value listed above and end with all possible higher values listed above.

Various illustrative embodiments described hereinafter mention SiC generally or 4H-SiC specifically, but it is to be appreciated that other suitable crystalline materials may be used. Among the various SiC polytypes, the 4H-SiC polytype is particularly attractive for power electronic devices due to its high thermal conductivity, wide bandgap, and isotropic electron mobility. Embodiments disclosed herein may apply to on-axis SiC (i.e., with no intentional angular deviation from the c-plane thereof) or off-axis SiC (i.e., typically departing from a grown axis such as the c-axis by a non-zero angle, typically in a range of from 0.5° to 10° or a subrange thereof such as 2° to 6° or another subrange). Certain embodiments disclosed herein may utilize on-axis 4H-SiC or vicinal (off-axis) 4H-SiC having an offcut in a range including 1° to 10°, or 2° to 6°, or about 2°, 4°, 6°, or 8°. Embodiments disclosed herein may apply to SiC wafers having multiple polytypes (e.g., 4H and 6H polytypes within a common SiC wafer).

Embodiments disclosed herein may also apply to both doped crystalline semiconductor materials (e.g., N-doped conductive SiC and/or P-doped SiC), co-doped, and/or undoped crystalline semiconductor materials (e.g., semi-insulating SiC or high resistivity SiC). In certain embodiments, SiC crystalline materials, including SiC boules and SiC wafers, may comprise N-type doping (including intentional and unintentional dopants such as nitrogen (N)) with concentrations in a range including $1 \times 10^{17}$ cm$^{-3}$ to $1 \times 10^{21}$ cm$^{-3}$, or in a range including $1 \times 10^{17}$ cm$^{-3}$ to $3 \times 10^{18}$ cm$^{-3}$, or in a range from $1 \times 10^{18}$ cm$^{-3}$ to $1 \times 10^{19}$ cm$^{-3}$, or in a range from $1 \times 10^{18}$ cm$^{-3}$ to $3 \times 10^{18}$ cm$^{-3}$, among others.

In certain embodiments, N-doped SiC crystalline materials may have a resistivity in a range including 0.001 ohm-cm to 0.05 ohm-cm, or in a range including 0.001 ohm-cm to 0.03 ohm-cm, or in a range from 0.005 ohm-cm to 0.05 ohm-cm, or in a range from 0.005 ohm-cm to 0.03 ohm-cm. In other embodiments, higher resistivity SiC crystalline materials, including semi-insulating SiC boules and semi-insulating SiC wafers, may comprise unintentionally doped or undoped SiC with a resistivity of at least 1500 ohm-cm, or at least 5000 ohm-cm, or at least 50,000 ohm-cm, or at least $1 \times 10^5$ ohm-cm, or at least $1 \times 10^6$ ohm-cm, or at least $1 \times 10^9$ ohm-cm, or at least $1 \times 10^{11}$ ohm-cm, or in a range including 1500 ohm-cm to $1 \times 10^{11}$ ohm-cm, or in a range including $1 \times 10^5$ ohm-cm to $1 \times 10^9$ ohm-cm, or in a range including $1 \times 10^5$ ohm-cm to $1 \times 10^{11}$ ohm-cm. Semi-insulating SiC wafers may be doped with vanadium (V), aluminum (Al), or combinations thereof. Co-doped SiC wafers may comprise combinations of two or more dopants, such as N, Al, and V, among others depending on the embodiment.

Crystalline SiC can include various structural crystal defects or extended defects, including dislocations (e.g., threading edge, threading screw, basal plane, and/or super screw dislocations or micropipes, among others), hexagonal voids, and stacking faults, among others. Mixed dislocations can include one or more combinations of different dislocations (e.g., threading edge, threading screw, basal plane, and/or super screw dislocations or micropipes) that intersect with one another or terminate with one another. For example, a mixed dislocation may include a threading screw dislocation and a basal plane dislocation that intersect or terminate with one another. Structural crystal defects may be formed during crystal growth and/or during heat-up or cooldown after growth where one or more discontinuities are formed in the material lattice structure of crystalline SiC. Such structural crystal defects can be detrimental to fabrication, proper operation, device yield, and reliability of semiconductor devices subsequently formed on SiC wafers.

Traditionally, crystalline defect characterization utilizes a variety of different characterization tools, each of which can have different strengths and weaknesses related to characterization of different defect types. Exemplary characterization tools and techniques include optical surface microscopy, photoluminescence (PL) microscopy, cross-polarized light imaging, and x-ray topography, among others. For defect characterization, it is sometimes necessary to combine information from multiple characterization sources of different types to provide an overall analysis. In doing so, alignment between images captured from the different sources is an important factor for understanding how combined information is spatially related within a crystalline material. Such alignment can be difficult as images of the same material captured from different sources may include different image rotations, different image centers, different resolutions, different sizes, different scales, and/or different distortions, among other differences. Additionally, alignment can be difficult due to the small sizes and overall amounts of crystalline defects that may be present. As described herein, images of the same material captured from different sources may be aligned by determining spatial differences between shared features and transforming at least one of the images according to the determined spatial differences. In this regard, the images may be sufficiently aligned so that information may be associated and/or transferred between the images, thereby providing the capability of forming a combined image and sub-images thereof with high resolution and spatial coordination between different image sources. With improved alignment, images may be more easily compared with imaging software and other programming tools.

FIG. 1A is an illustration of a first wafer image 10 that is captured by an imaging source for crystalline materials. The first wafer image 10 is captured for a wafer 12 that may include any number of sizes, including exemplary diameters of approximately 100 mm, or 150 mm, or 200 mm, 300 mm or greater, although smaller diameters may also be provided. In certain embodiments, the diameters may include different ranges that begin with each value listed above and end with all possible higher values listed above. For such sizes, the first wafer image 10 may be subdivided into a number of tiles 14 or sub-images for improved image capturing analysis of various crystalline features 16, 18 that may be present in the wafer 12. In this manner, the first wafer image 10 may be provided as a plurality of smaller images that correspond to the tiles 14, each of which includes information corresponding to a center and size (e.g., length and width) of each tile 14 so that the tiles 14 may be stitched together to provide the first wafer image 10. For illustrative purposes, the first wafer image 10 is shown with a 6×6 array of tiles 14. In practice, any number of tiles 14 may be provided. For example, an approximately 150 mm diameter wafer may be subdivided into 6,000 or more tiles 14.

As illustrated, the crystalline features 16, 18 may be scattered across various locations of the wafer 12 and in different corresponding tiles 14. In FIG. 1A, the crystalline features 16 correspond with features that may also be visible in other images of the wafer 12 that are captured with different imaging techniques, and the crystalline features 18 correspond with features that may not be clearly visible in the other images. While only three crystalline features 16 and two crystalline features 18 are illustrated, the wafer 12 may include any number of such crystalline features 16, 18. Additionally, for illustrative purposes, the crystalline features 16 are represented as squares and the crystalline features 18 are represented as triangles. In practice, the crystalline features 16, 18 can appear in various sizes, shapes, and quantities depending on the type of crystalline feature. In certain embodiments, the wafer 12 may comprise a SiC wafer, and the crystalline features 16, 18 may comprise one or more combinations of threading edge dislocations, threading screw dislocations, basal plane dislocations, super screw dislocations or micropipes, mixed dislocations, hexagonal voids, and stacking faults, among others. In certain embodiments, the first wafer image 10 may comprise an image captured by one of optical surface microscopy, PL microscopy, cross-polarized light imaging, and x-ray topography, among others. In other embodiments, the first wafer image 10 may be formed by spatially correlating data that is provided by one or more of a model, simulation, or mathematical calculation of a particular parameter, such as strain or stress modeling.

Figure 1B:
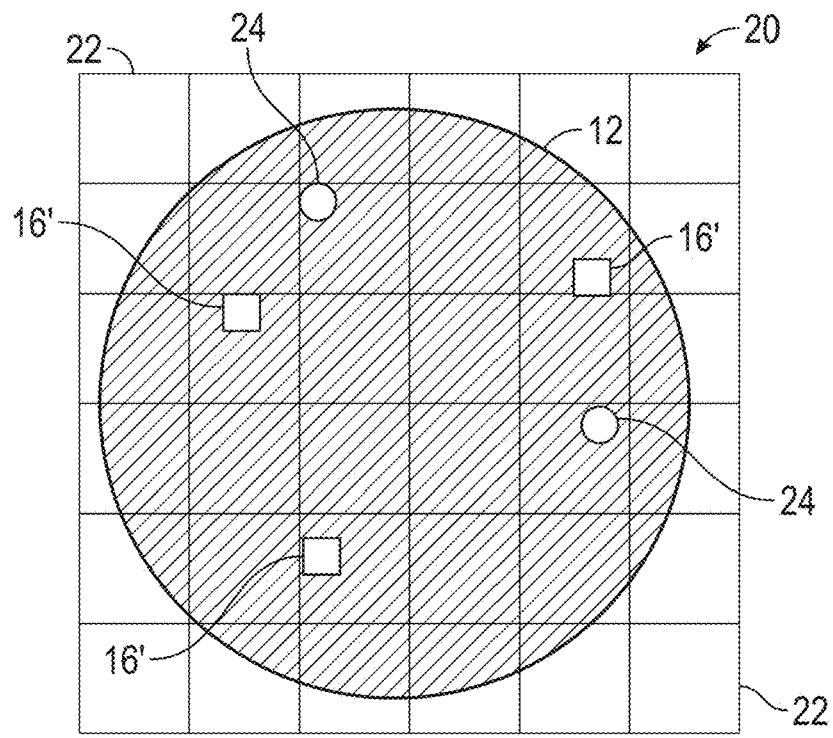
FIG. 1B is an illustration of a second wafer image of the wafer of FIG. 1A that is captured by a different imaging source.

FIG. 1B is an illustration of a second wafer image 20 of the wafer 12 that is captured by a different imaging source than the first wafer image 10 of FIG. 1A. The second wafer image 20 may also be divided into a number of tiles 22 or sub-images as described above. In FIG. 1B, common crystalline features 16' are spatially misaligned with positions of the same crystalline features 16 in the first wafer image 10 of FIG. 1A. Such misalignment may be due to one or more different image rotations, different image centers, different resolutions, different sizes, different scales, and/or different distortions, among others, between the first wafer image 10 and the second wafer image 20. In certain embodiments, the second wafer image 20 may comprise an image captured by one of optical surface microscopy, PL microscopy, cross-polarized light imaging, and x-ray topography, among others that is different than the first wafer image 10. In other embodiments, the second wafer image 20 may be formed by spatially correlating data that is provided by a model or mathematical calculation of a particular parameter, such as strain or stress modeling. In addition to the common crystalline features 16', the second wafer image 20 may also include any number of additional crystalline features 24 that may not be clearly visible in the first wafer image 10 due to the different imaging technique used. Furthermore, the crystalline features 18 of FIG. 1A may not be clearly visible in the second wafer image 20.

Figure 2A:
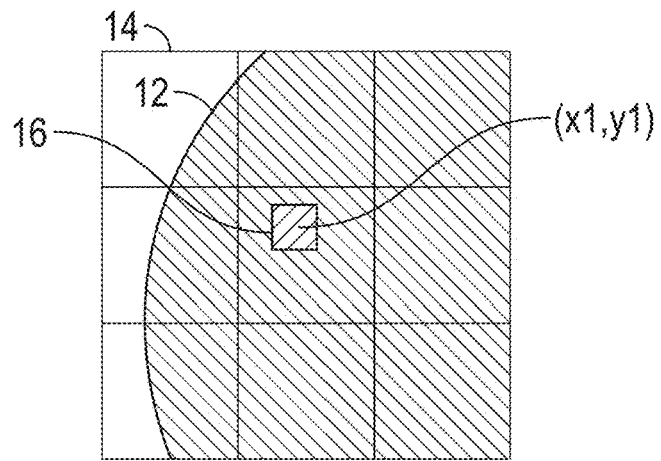
FIG. 2A illustrates a grouping of tiles or subsections identified and accessed from the first wafer image of FIG. 1A that includes a crystalline feature.
Figure 2B:
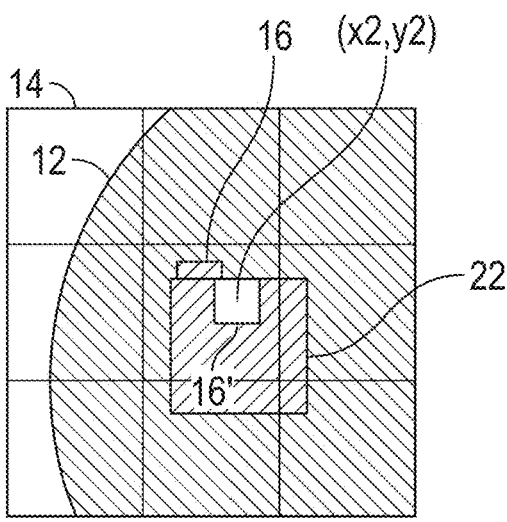
FIG. 2B illustrates a tile from the second wafer image of FIG. 1B that includes the crystalline feature of FIG. 2A overlaid on the illustration of FIG. 2A.
Figure 2C:
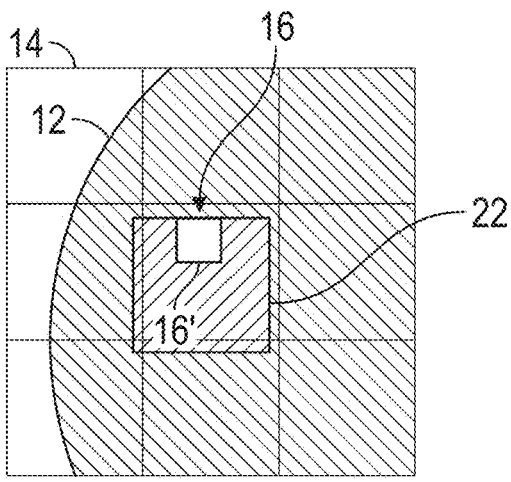
FIG. 2C illustrates FIG. 2B after transformation and alignment of the crystalline feature.

FIGS. 2A-2C illustrate steps for alignment between the first wafer image 10 of FIG. 1A and the second wafer image 20 of FIG. 1B. FIG. 2A illustrates a grouping or first subsection of the tiles 14 identified and accessed from the first wafer image 10 of FIG. 1A that includes one of the crystalline features 16. While nine tiles 14 are illustrated in FIG. 2A to provide the first subsection of the first wafer image 10, the first subsection may include any number of tiles, including a grid of four tiles 14 or even a single tile 14. The crystalline feature 16 is assigned a first coordinate position, such as an (x1, y1) coordinate, that corresponds to a location of the crystalline feature 16 in the first wafer image 10.

In FIG. 2B, a tile 22 from the second wafer image 20 of FIG. 1B that includes the same crystalline feature 16' is accessed and overlaid on the first subsection of tiles 14 from FIG. 2A. The tile 22 is identified and accessed from the second wafer image 20 as a second subsection. While only the single tile 22 is shown, the second subsection may include any number of tiles 22 as described above for FIG. 2A. The crystalline feature 16' has been assigned a second coordinate position, such as an (x2, y2) coordinate, that corresponds to a location of the crystalline feature 16' in the second wafer image 20. In this manner, a point pair that corresponds to the same or common crystalline feature 16, 16' is provided that includes the first coordinate (x1, y1) and second coordinate (x2, y2). Each coordinate and point pair may be identified manually or by automated image analysis. In certain embodiments, the above steps are repeated any number of times to provide a number of point pairs corresponding to a different crystalline features 16 depending on the number of different crystalline features 16 present and the amount of resolution desired for alignment. For example, a single point pair may be provided, or the above steps may be repeated to provide two point pairs, five point pairs, ten point pairs, twenty point pairs, or a range including two point pairs to twenty point pairs, or more. In this regard, differences between the first coordinate (x1, y1) and the second coordinate (x2, y2) may be quantified and compared for any number of point pairs to determine a transformation matrix that may be applied to transform either the first coordinate (x1, y1) or the second coordinate (x2, y2) into a transformed first coordinate or a transformed second coordinate for each point pair to improve image alignment. Depending on the number of point pairs used, the transformation matrix may be configured to provide transformation and image adjustment that compensates for variations in image rotation, shift, scale, shear, projection, and/or local distortion, among other image to image variations. In certain embodiments, the transformation matrix may comprise one or more of a homography matrix, affine transformation, and similarity transformation, among others.

In FIG. 2C, the tile 22 from FIG. 2B is overlaid on the first subsection of tiles 14 after transformation and alignment of the common crystalline feature 16, 16'. In particular, the common crystalline feature 16, 16' is now aligned less than or equal to 20 μm, or less than or equal to 15 μm, or less than or equal to 10 μm, or less than or equal to 3 μm, or in range including 1 μm and 20 μm, or in range including 1 μm and 15 μm, or in range including 1 μm and 10 μm between the first wafer image 10 and the second wafer image 20. Other ranges may include different ranges that begin with each value listed above and end with all possible higher values listed above. Alignment within such precise dimensions is important for spatially correlating data related to crystalline features and defects of certain sizes. For example, SiC crystalline defects as captured by one or more various imaging techniques may have certain overall dimensions that are less than or equal to 25 μm or smaller. In particular, SiC crystalline defects may have a smallest width that is less than or equal to 25 μm, or less than or equal to 10 μm, or less than or equal to 3 μm, or in a range including 1 μm and 25 μm, or in a range including 1 μm and 10 μm. Other ranges may include different width ranges that begin with each value listed above and end with all possible higher values listed above. Different SiC crystalline defects may appear with any number of different shapes in captured images. As such, the smallest width refers to a smallest dimension as measured between two opposing sides or points of a crystalline defect. By way of examples, the smallest width of a circle is the diameter, the smallest width of a hexagon is the distance between opposing parallel sides, and the smallest width of an oval is the distance of a minor axis of the oval. For an irregular shape, the smallest width corresponds to the smallest width of a bounding box that is drawn to include the farthest boundary points of the irregular shape.

Another way to quantify alignment between the first wafer image 10 and the second wafer image 20 is to determine if pixel groups that are registered with a common crystalline feature in each of the first wafer image 10 and the second wafer image 20 are at least partially overlapped after alignment. For example, a first pixel group for the crystalline feature 16 of FIG. 2A may be provided by determining and grouping each pixel of the first wafer image 10 that includes a portion of the crystalline feature 16. In a similar manner, a second pixel group for the same crystalline feature 16' in the second wafer image 20 may be provided by determining and grouping each pixel that includes a portion of the crystalline feature 16' in the second wafer image 20. After alignment, the first and second pixel groups may at least be partially overlapped for the common crystalline feature 16, 16'. Depending on the type of images being compared and corresponding image resolutions and magnifications, individual pixel sizes between different wafer images may be the same or different. By way of examples, some optical microscopy images may have pixel sizes of 1.7 μm, some PL images may have pixel sizes of 3.4 μm, and some cross-polarized light images and some x-ray topography images may have pixel sizes of 7 μm, although other pixel sizes such as 10 μm may be provided depending on the type of tool used to capture the images. As such, a pixel size for various wafer images may be the same or different in a range including 3 μm and 10 μm. In certain embodiments, pixels may form square shapes with the above dimensions. In other embodiments, pixels may form other shapes such as rectangles among others, with lengths or widths having the above dimensions.

Figure 3A:
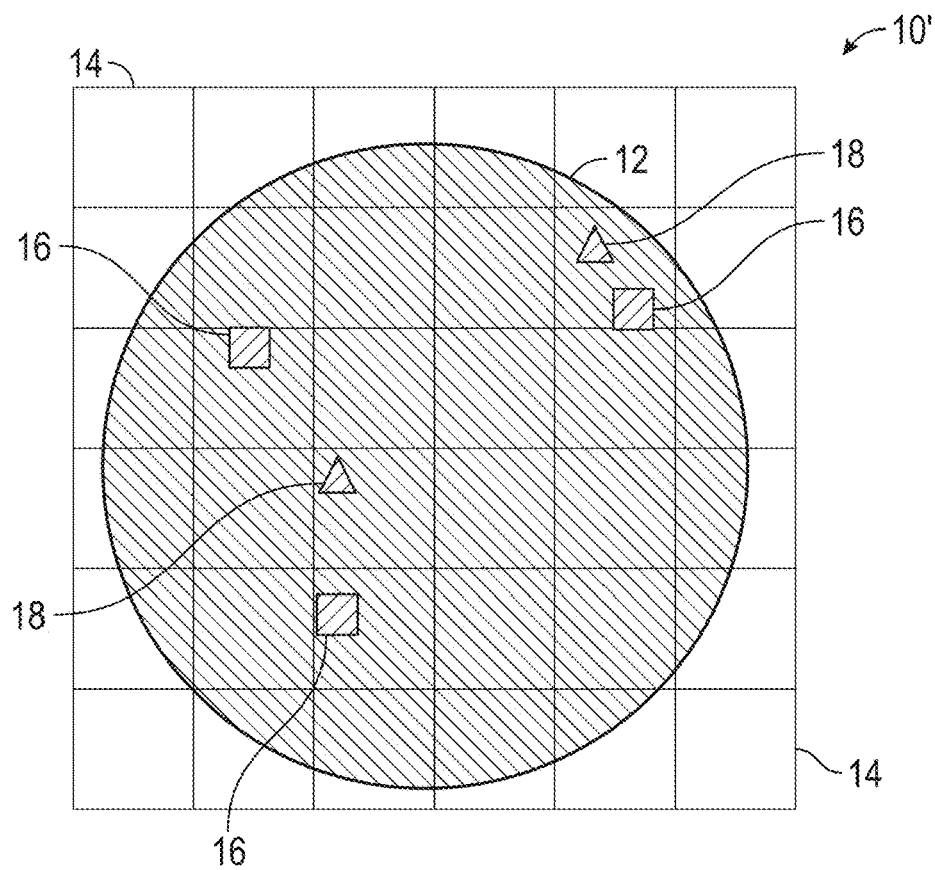
FIG. 3A is an illustration of a transformed first wafer image after a transformation matrix has been applied to the first wafer image of FIG. 1A.

FIG. 3A is an illustration of a transformed first wafer image 10' after a transformation matrix has been applied to the first wafer image 10. In this regard, the first wafer image 10 is transformed for improved alignment and spatial correlation with the second wafer image 20 of FIG. 1B. As illustrated, relative positions of the common crystalline features 16 are shifted for improved alignment with positions of the crystalline features 16' in the second wafer image of FIG. 1B. Additionally, relative positions of the crystalline features 18 are also shifted. In this regard, analysis of the transformed first wafer image 10' may be spatially correlated with the analysis of the second wafer image 20 of FIG. 1B.

Figure 3B:
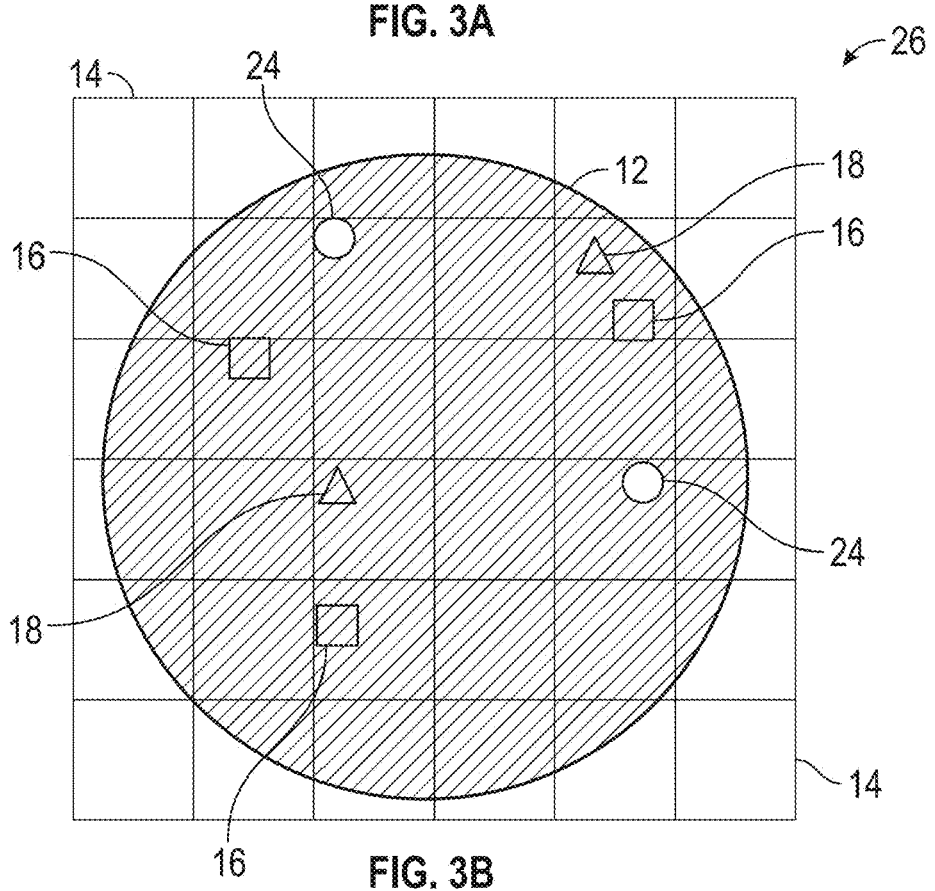
FIG. 3B is an illustration of a combined wafer image that includes spatially correlated information provided by both of the transformed first wafer image of FIG. 3A and the second wafer image of FIG. 1B.

FIG. 3B is an illustration of a combined wafer image 26 that includes spatially correlated information provided by both of the transformed first wafer image 10' of FIG. 3A and the second wafer image 20 of FIG. 1B. As illustrated, the combined wafer image 26 includes the common crystalline features 16 as aligned and the spatially correlated crystalline features 18, 24 that were captured from the different image sources. While the combined wafer image 26 is illustrated for two different image sources, any number of different image sources may be combined. For example, the combined wafer image 26 may include spatially correlated data from any or all of optical surface microscopy, PL microscopy, cross-polarized light imaging, and x-ray topography sources. With suitable aligned data from various image sources, the combined wafer image 26 may be provided in any format. In certain embodiments, the format of the combined wafer image 26 may be selected to correspond to a particular format of one of the various image sources. In other embodiments, the format of the combined wafer image 26 may be selected to correspond to a format that is different from formats of any of the various image sources. The combined wafer image 26 may further be subdivided into tiles or subsections to provide images of particular wafer sections for analysis.

Combined wafer images with data from multiple imaging sources may be useful for detection, identification, and characterization of crystalline defects in many applications. For example, destructive and nondestructive data and images from the same crystalline wafer may be aligned and spatially correlated as described herein. Additionally, certain embodiments relate to alignment between two different nondestructive images or alignment between two different destructive images. As used herein, the terms "nondestructive data" and "nondestructive image" of a crystalline material respectively refer to data and an image that have been obtained without destroying, consuming, or otherwise damaging the crystalline material. In this regard, nondestructive data and nondestructive images may be obtained for a crystalline material on which one or more devices may subsequently be formed. For example, a spatially coordinated PL image of an unetched SiC wafer may be referred to as a nondestructive image. In contrast, the terms "destructive data" and "destructive image" refer to data or an image of a crystalline material that has been destroyed, consumed, or otherwise damaged to the point that subsequent devices may not be formed thereon. For example, any spatially coordinated image of a SiC wafer that has been etched with KOH/EOH or the like to delineate etch pits may be referred to as a destructive image. As generally used herein, data (nondestructive and destructive) that is spatially coordinated (e.g., to an x and y position of a wafer) is referred to as an image. Additionally, nondestructive and destructive data and corresponding images may include one or more data signals or data channels. For example, a data signal may comprise a light emission characteristic from a crystalline defect analyzed through a light filter. Data signals may correspond to absorption signals and/or emission signals.

For SiC, nondestructive PL data and images may be obtained for unetched wafers that may comprise polished or unpolished surfaces. Polishing may be provided by chemical mechanical polishing (CMP) in certain embodiments. During PL microscopy, the unetched wafers may be scanned with both visible and ultraviolet (UV) light, and surface images and near infrared (NIR) filtered light channels are recorded. Besides NIR filtered light, any PL emission measurements may be recorded depending on the embodiment. During PL microscopy, any light source may be selected that has a suitable wavelength spectrum configured to provide PL emission of a specific material. For example, a suitable wavelength spectrum for SiC may include UV light. Any defects in the wafer are illuminated to the penetration depth of the UV light and also on the surface if present. The output of the PL images includes optically reflecting defects and UV-excited emission from defects across the wafer surface. Mapping the UV-excited PL emission in a SiC wafer may be useful to understand the distribution of defects in the SiC wafer that would underlie potential devices fabricated thereon. While PL microscopy provides a characterization method for certain extended defects in epitaxial 4H-SiC and SiC wafers for characterization and mapping, the illuminated defects are near surface only, due to the small penetration depth of the UV excitation. In this manner, nondestructive PL images from unetched wafers may be compared to destructively etched images of the same wafer to provide combined analysis.

For SiC, counting certain extended defects may be accomplished by delineating etch pits and counting them manually, or with automated microscopy tools. Etching SiC reveals features such as etch pits that can be recognized and correlated to other characterization methods such as synchrotron x-ray topography (SXRT). Wafer etching effectively destroys usable wafer area, is expensive, requires corrosive chemistries, requires constant attention to maintain a viable process, and is time consuming. As such, conventional technology for characterizing crystal defects involves destructively imaging the wafer being characterized, thereby rendering the characterized wafer useless for subsequent device fabrication. In this regard, only a few sacrificial wafers per crystal are typically sampled, which limits the amount of information available for process improvement and control. By way of example, to perform defect characterization on a SiC wafer, the silicon face (Si-face) and/or the carbon face (C-face) of the SiC wafer may be etched to highlight crystalline defects for imaging. Observed etch pits and defects may then be determined for type manually, or by automated defect recognition, and counted for reporting. An optical scanner, or a manual or automatic optical microscope, may be used for defect counting from the image. After capturing both destructive and nondestructive images from the SiC wafer, the images may be aligned and spatially correlated for analysis.

Figure 4A:
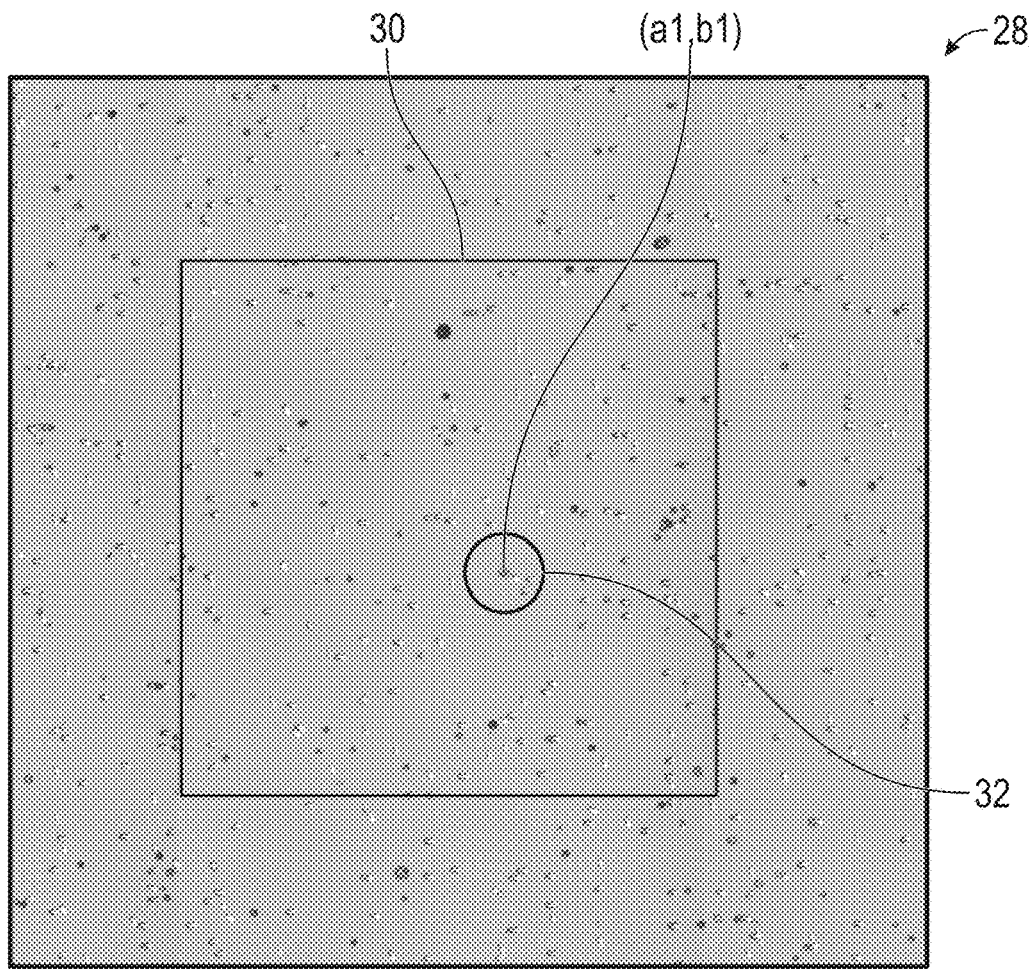
FIG. 4A is a destructive image of a portion of a silicon carbide (SiC) wafer after etching to delineate crystalline features.

FIG. 4A is a destructive image 28 of a portion of a SiC wafer after etching to delineate crystalline features. The destructive image 28 was captured by optical microscopy from the Si-face of the SiC wafer after etching of the Si-face. In the destructive image 28, a large quantity of crystalline features of varying types are shown, including various crystalline defects. A tile 30 of the destructive image 28 is superimposed in the center of FIG. 4A. Within the tile 30, a threading dislocation 32 is identified at a center of a superimposed circle. The threading dislocation 32 is assigned a first coordinate position (a1, b1) that corresponds to a location of the threading dislocation 32 in the destructive image 28.

Figure 4B:
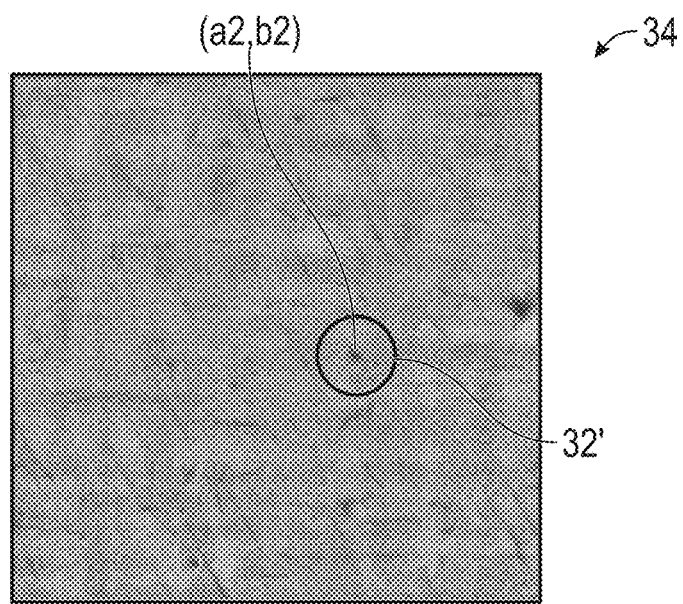
FIG. 4B is a nondestructive image of a portion of the SiC wafer of FIG. 4A that includes a common threading dislocation.

FIG. 4B is a nondestructive image 34 of a portion of the SiC wafer of FIG. 4A that includes the threading dislocation 32 (labeled 32' in FIG. 4B). The nondestructive image 34 was captured by PL microscopy from the Si-face of the SiC wafer before etching of the Si-face. For illustrative purposes, the nondestructive image 34 is represented as a single tile. As shown, the PL image includes dark linear or elongated regions and concentrated dark spots that are scattered in a somewhat noisy background. Due to the penetration depth during PL microscopy, the light and dark contrast regions in the PL image correspond to possible dislocations or defects of various types in the near surface (e.g., depth<$\mu$m) of the SiC wafer. The threading dislocation 32' is noticeably present and may accordingly be used for alignment with the destructive image 28 of FIG. 4A. In this regard, the threading dislocation 32' is assigned a second coordinate position (a2, b2), that corresponds to a location of the threading dislocation 32' in the nondestructive image 34. A point pair that corresponds to the same threading dislocation 32, 32' may then be provided that includes the first coordinate (a1, b1) and second coordinate (a2, b2). As previously described, the above steps may be repeated any number of times to provide a number of point pairs corresponding to different crystalline features. Differences between the first coordinate (a1, b1) and the second coordinate (a2, b2) may then be quantified and compared for any number of point pairs to provide a transformation matrix for alignment.

Figure 4C:
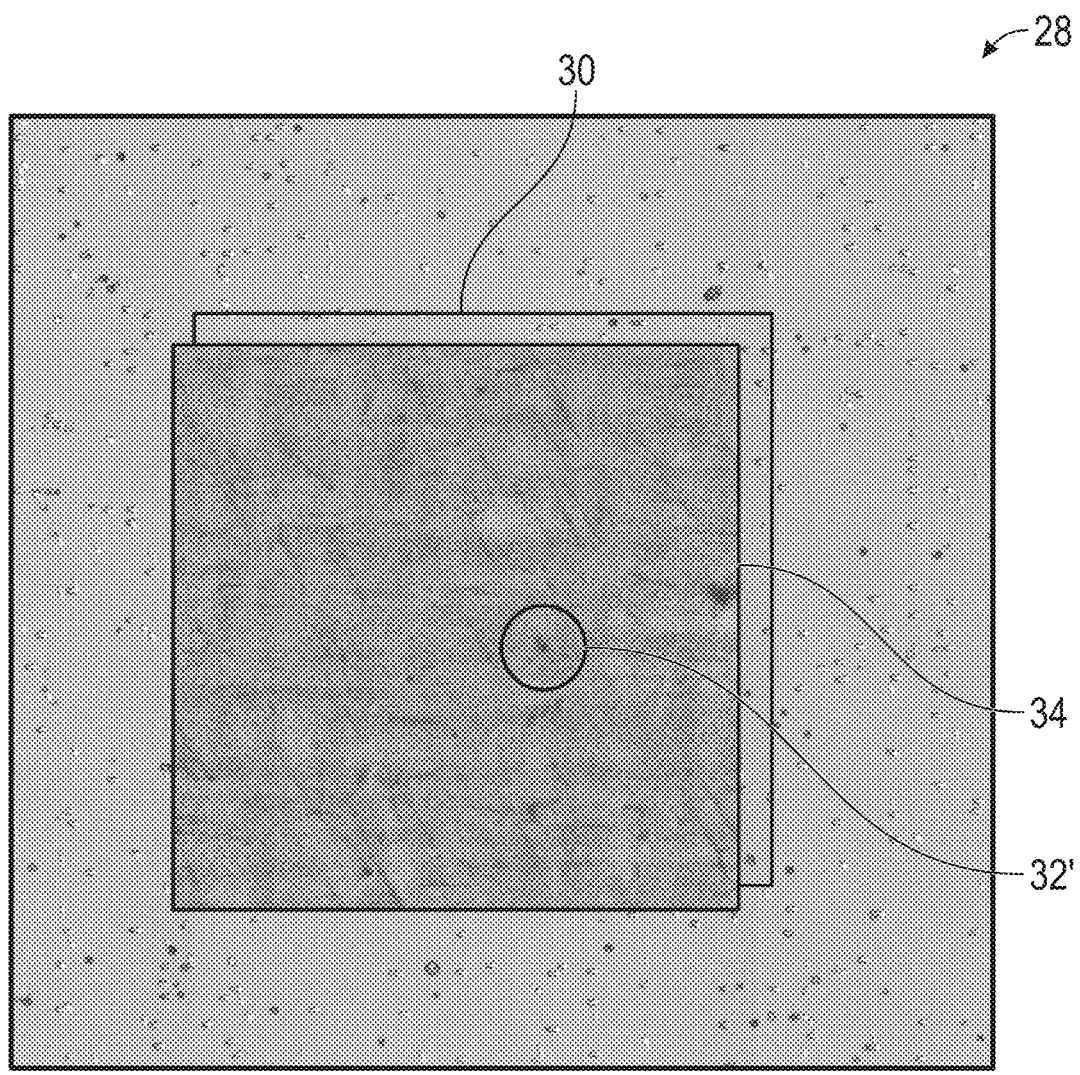
FIG. 4C illustrates the destructive image of FIG. 4A overlaid with the nondestructive image of FIG. 4B after a transformation matrix has been applied.

FIG. 4C illustrates the destructive image 28 of FIG. 4A overlaid with the nondestructive image 34 of FIG. 4B after a transformation matrix has been applied. As illustrated, the nondestructive image 34 may be aligned with the destructive image 28 such that location of the threading dislocation 32' in the nondestructive image 34 is spatially correlated with the threading dislocation 32 in the destructive image 28. In this regard, different crystalline features that are more clearly visible in different ones of the destructive image 28 and the nondestructive image 34 may also be spatially correlated. While the embodiments described for FIGS. 4A-4C are captured for the same SiC wafer, images of different SiC wafers that are provided from a same crystalline boule may also be aligned. For example, multiple SiC wafers formed from a common region of a same SiC crystalline boule may have the same or similar defect distributions such that common crystalline features may be identified for alignment purposes.

In certain embodiments, image alignment as described herein may be provided in the development of processes or tools that are configured to provide predictive or inferred defect analysis with nondestructive imaging. In order to develop such tools, spatial correlation between nondestructive images and destructive images of the same or similar wafers is needed. As previously described, destructive imaging may provide greater detection and identification of certain crystalline defects, but at the cost of rendering the wafer unusable. In this regard, processes or tools may be developed by initially comparing crystalline features between nondestructive images and destructive images to build improved recognition of certain crystalline defects in the nondestructive images. Such information may later be applied to nondestructive images of other wafers to infer certain crystalline defects without having to perform destructive imaging. In this manner, spatially coordinating nondestructive images and destructive images as disclosed herein may provide improved accuracy for inferred crystalline defect analysis.

Figure 5A:
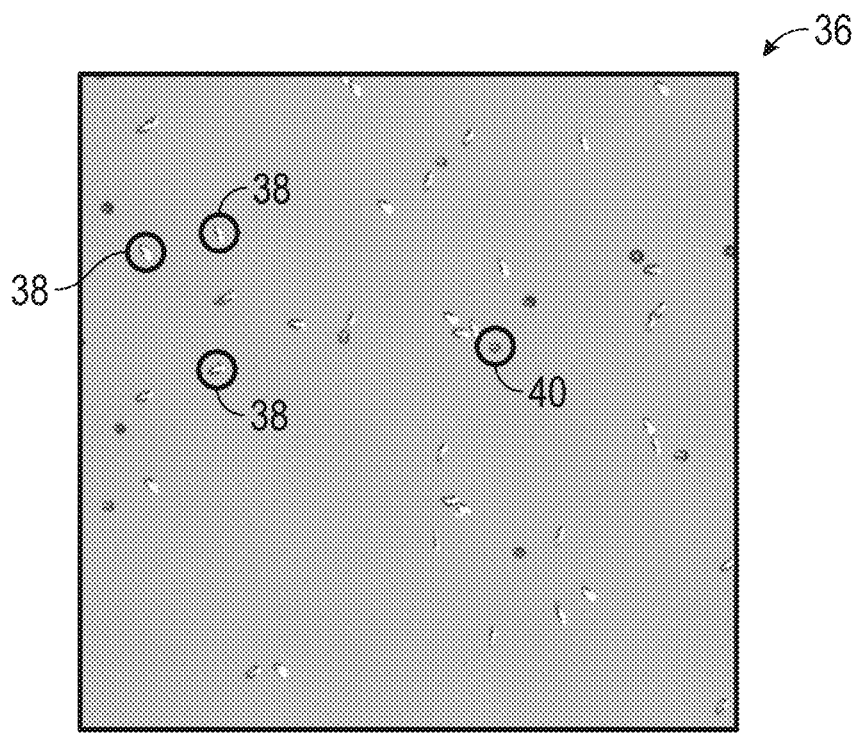
FIG. 5A illustrates a destructive image of a portion of a SiC wafer after etching where basal plane dislocations and threading dislocations are delineated.
Figure 5B:
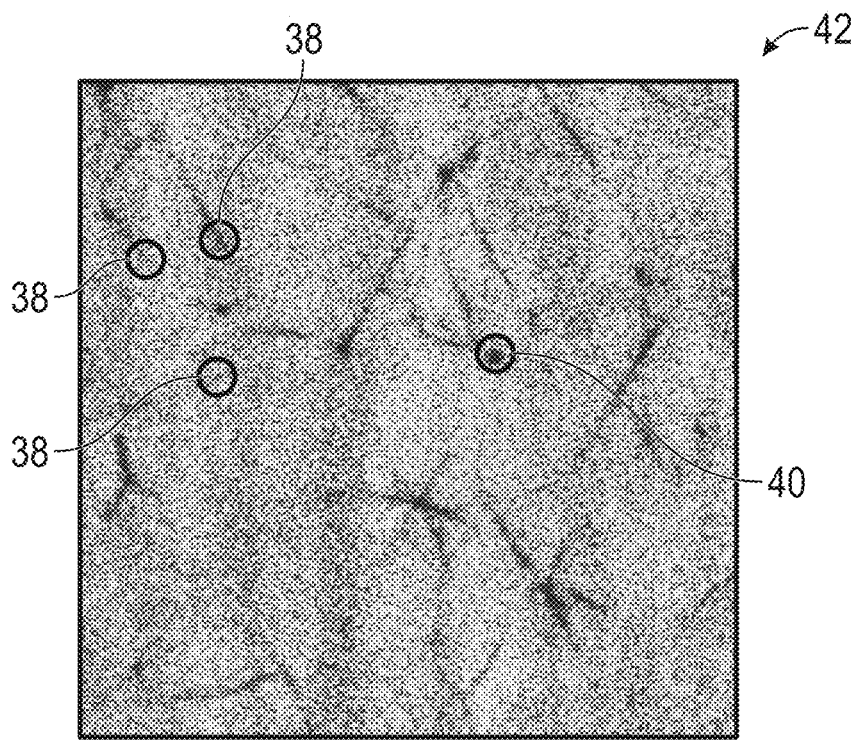
FIG. 5B illustrates a nondestructive image that was captured from the same portion of the SiC wafer as shown in FIG. 5A.

FIG. 5A illustrates a destructive image 36 of a portion of a SiC wafer after etching where basal plane dislocations 38 and threading dislocations 40 are delineated. In FIG. 5A, three exemplary basal plane dislocations 38 and one exemplary threading dislocation 40 are indicated. FIG. 5B illustrates a nondestructive image 42 that was captured from the same portion of the SiC wafer as shown in FIG. 5A. In FIG. 5B, the same three exemplary basal plane dislocations 38 and the one exemplary threading dislocation 40 are also indicated. In a comparison of FIG. 5A and FIG. 5B, the basal plane dislocations 38 and threading dislocation 40 are present in both images, but they are more clearly defined in FIG. 5A. With spatial alignment by way of identifying coordinate pairs and applying a corresponding transformation matrix as previously described, features present in the nondestructive image 42 may be more accurately correlated with the destructive image 36.

After sufficient correlation between properly aligned destructive images and nondestructive images, defects in SiC wafers may be detected from the Si-face and/or the C-face without destructive imaging, thereby reducing tool throughput time and counting cycle time and preserving resources. In certain embodiments, a method to detect, identify, and count defects is based on one or more combinations of automated defect detection or software to label defects, manual counting of defects, continuously improving understanding of defect characteristics and counting, and integrating this information into a machine-learned neural network. In this manner, the machine-learned neural network may then be appropriately trained to automatically infer defects from one or more nondestructive images of a wafer. Neural networks may provide the capability to reduce high-dimensionality image data into usable defect position and labels for counting and characterization. By nondestructively detecting and identifying defects, defect characterization may be provided for the exact same wafer or wafer that a device is formed thereon, and performance characteristics of the device can be characterized based on the underlying defect structure of the wafer. From this, a better understanding of the priority of importance of defects in the wafer may be determined. In certain embodiments, the technique could be extended to pre-ink or mark areas on wafers that would fail, based on this learning. In certain embodiments, neural networks may comprise deep neural networks (DNNs). For improved alignment between various destructive and nondestructive images, transformation matrixes as described above may be determined and corresponding aligned or combined wafer images may be provided to DNNs for training.

As used herein, a DNN may include a deep convolutional neural network (DCCN), a generative adversarial network (GAN), a convolutional neural network (CNN), regions with convolutional neural network features (R-CNN), and a conditional adversarial network or the like. In certain embodiments, defect categories that may include one or more of dislocations (e.g., threading edge, threading screw, basal plane, super screw dislocations or micropipes, and mixed dislocations, among others), hexagonal voids, and stacking faults, among others may be characterized from nondestructive images.

Embodiments disclosed herein may allow integration of other characterization methods such as wafer topography images, cross-polarizer images and any other characterization method that provides images into machine learning for detecting, identifying, and/or counting defects. Embodiments disclosed herein may incorporate labeling of defects, analysis from x-ray topography, and micropipe counting into training and developing neural networks. New characterization methods of defects may be integrated into the embodiments as disclosed herein. Embodiments disclosed herein may be related to a machine-learned convolutional neural network that is trained on many images that are pre-labeled.

In this manner, PL images from unetched wafers may be compared to etched images of the same wafer to provide initial information for machine learning and training to teach and build a neural network for defect characterization. With sufficient training of the neural network, PL images from other unetched wafers may be processed by the neural network to infer predicted etch features without requiring such wafers to be destructively etched. The predicted etch features may then correspond to positions and defect categories for the SiC wafers. In certain embodiments, each of the PL images may correspond with a portion of a SiC wafer and a plurality of PL images may collectively correspond to an entire surface of a particular wafer. As such, these defect categories and positions may then can be counted and summarized to indicate the overall crystalline quality of the wafer with respect to defects. In this manner, defect characterization may be provided for wafers that will be used for device fabrication.

In certain embodiments, a DNN may be configured to detect and identify certain defects that are typically identified from destructive C-face images only by accessing nondestructive Si-face images of SiC wafers. For example, threading screw dislocations in SiC wafers can be difficult to identify from destructive images of the Si-face. In particular, threading screw dislocations may be difficult to distinguish from other threading dislocations, such as threading edge dislocations, in destructive Si-face images. As such, destructive images of the C-face are typically needed to accurately identify threading screw dislocations in the crystalline material. Nondestructive PL images taken from both the C-face and the Si-face may have similar appearances of light and dark contrasting regions. In this regard, a DNN may be developed for detection of threading screw dislocations from the Si-face by comparing and aligning a number of destructive C-face images with identified threading screw dislocations to corresponding nondestructive Si-face images. After suitable training of the DNN on the number of images, the DNN may accordingly be configured to detect and identify threading screw dislocations from nondestructive Si-face images of SiC wafers.

In certain embodiments, neural networks as described herein may comprise one or more of a machine-learned CNN or a DCNN. DCCNs have typically been used to perform computer vision tasks such as image classification and object detection in a host of different contexts from cell phones to satellite images and magnetic resonance imaging (MRI). As described herein, accuracy of a DCNN for crystalline defect characterization can be attributed to the ability to build and learn a complex combination of image filters for the specific task at hand. For the DCNN to learn to correctly classify an image or locate a particular defect within an image, many annotated images are needed to achieve a result that suitably generalizes various defect features. During the training process, the DCNN receives an input image and processes it through a network of convolutional layers. For training, the parameters of the DCCN may be updated according to standard optimization techniques, including stochastic gradient descent, root mean square propagation (RMSProp), adaptive moment estimation or Adam optimization, and adaptive gradient algorithms ADAGRAD and ADADELTA. The output of the DCNN may include a probability distribution of defect categories and locations. An objective of the DCNN is to minimize the error between the predicted defect category and location and the annotated defect category and location.

In certain embodiments, a neural network is trained on many images (e.g., 6000 images or more per wafer in certain embodiments) that are pre-labeled for defects from automated optical microscopy of etched images. In order to provide neural network training, images of a PL channel can be aligned with the automatic output labels of the etched wafer images that correspond to the unetched PL images for the exact same wafer. Due to the high volume of images, automating the step of identifying and counting defects in the etched images may provide more consistent counts and more accurate training of the neural network. In certain embodiments, additional network training that involves manually labeling defects may also be used to increase the accuracy of the count for network training. For example, micropipes may be manually identified and counted and such information may be provided for training of the neural network.

Figure 6:
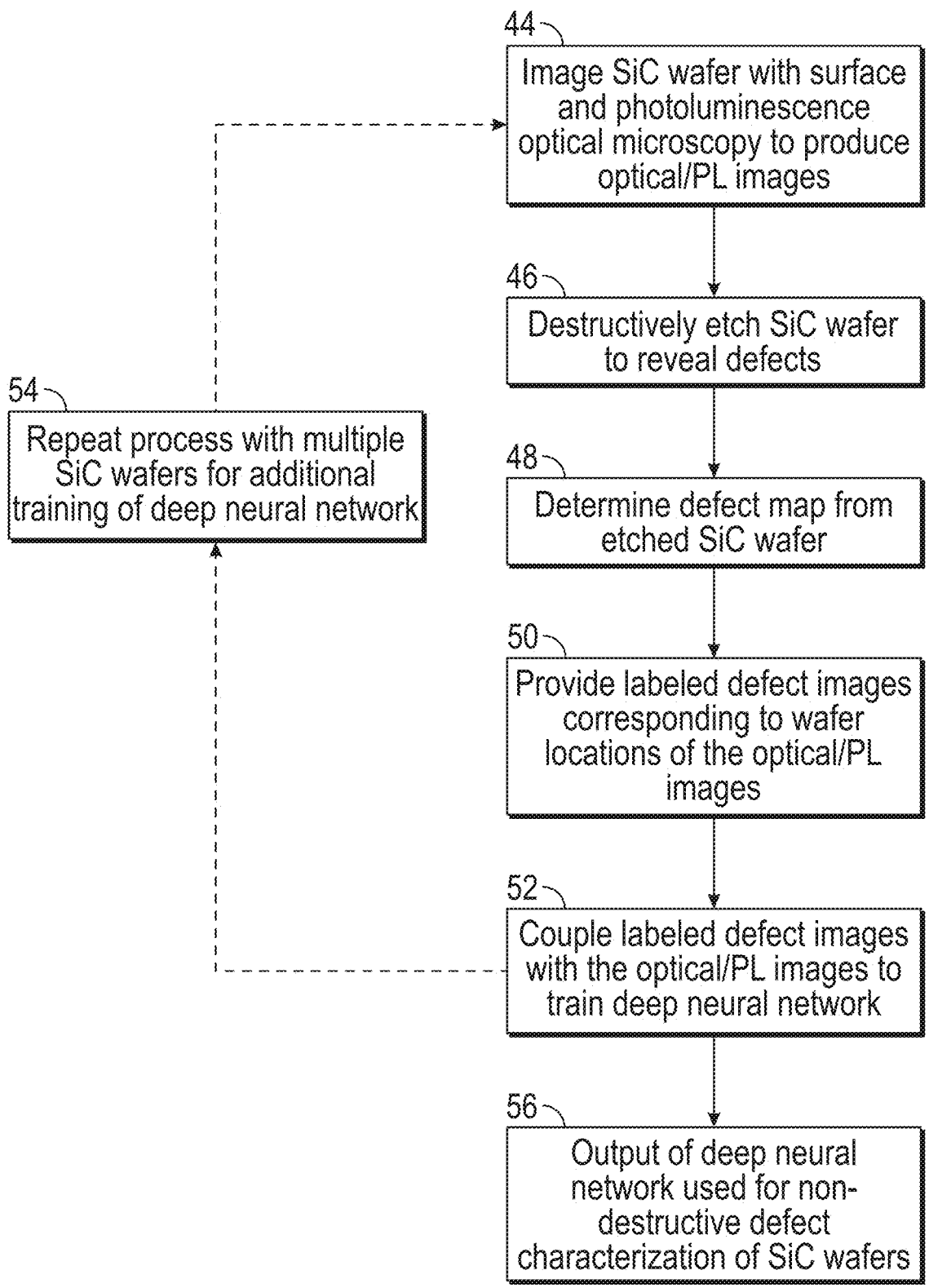
FIG. 6 represents a schematic process flow for training and development of a deep neural network (DNN) according to embodiments disclosed herein.

FIG. 6 represents a schematic process flow for training and development of a DNN according to embodiments disclosed herein. In a first step 44, a SiC wafer is nondestructively imaged with surface and PL optical microscopy to produce one or more optical/PL images that correspond with certain wafer locations. For an entire surface of a SiC wafer, a plurality of optical/PL images may be captured. In other embodiments, the first step 44 may include capturing other nondestructive data in addition to or in place of the optical/PL images. In a second step 46, a surface (e.g., the Si-face and/or the C-face) of the same SiC wafer from the first step 44 is destructively etched to reveal or highlight defects. In a third step 48, a defect map is formed either by automatic or manual inspection of the etched surface(s) of the SiC wafer. In a fourth step 50, the defect map is used to form labeled defect images corresponding to the various wafer locations of the optical/PL images. For example, the defect locations identified in step 50 may be overlaid with the optical/PL images of step 44 for corresponding wafer locations. In a fifth step 52, the labeled defect images are coupled and provided to train the DNN. As indicated by an optional step 54, the process may be repeated for multiple SiC wafers for additional training of the DNN. In step 56, the output of the DNN, as trained by the preceding steps, may be subsequently used for nondestructive defect characterization of SiC wafers.

Figure 7:
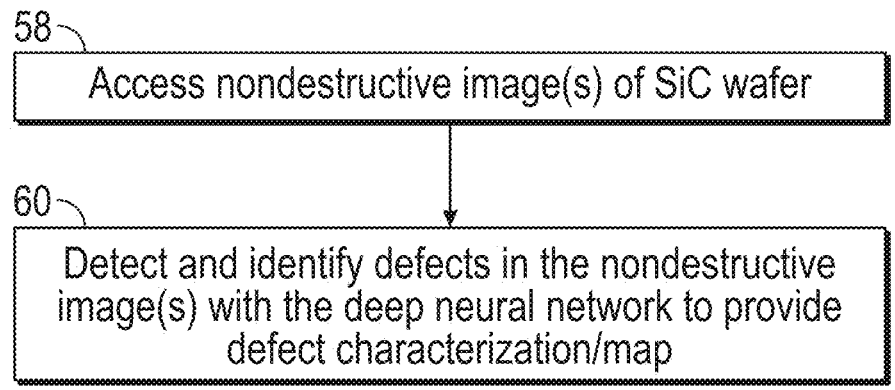
FIG. 7 represents a schematic process flow for nondestructive defect characterization of SiC wafers with a trained DNN.

FIG. 7 represents a schematic process flow for nondestructive defect characterization of SiC wafers with a trained DNN. After the DNN is trained and developed according to FIG. 6, SiC wafers may be nondestructively imaged with, for example, surface and PL optical microscopy. As indicated by step 58, such images may be accessed for defect characterization. In step 60, the accessed images may be processed with the DNN to provide defect characterization, including defect counts, locations, and maps for the SiC wafers. In this regard, once the DNN is trained according to FIG. 6, defect characterization for high volumes of SiC wafers may be performed without destructive etching steps associated with conventional techniques. Additionally, such defect characterization may be rapidly performed with accurate results, thereby providing faster feedback of defect information during manufacturing. In certain embodiments, defect characterization may comprise analyzing high quantities (e.g., 6000 images or more) of nondestructive images/data for each wafer with a processing time of five minutes per wafer or less (e.g., 0.05 seconds per image for 6000 images), or two minutes per wafer or less (e.g., 0.02 seconds per image for 6000 images), or one minute per wafer or less (e.g., 0.01 seconds per image for 6000 images). In certain embodiments, the processing time may include a range including 0.01 seconds per image to 0.05 seconds per image, or a range including 0.01 seconds per image to 0.02 seconds per image, or a range including 0.02 seconds per image to 0.05 seconds per image for 6000 images. In certain embodiments, defect analysis and characterization may also be performed on SiC wafers where one or more epitaxial layers have been subsequently formed. In this manner, nondestructive data and images of SiC wafers with epitaxial layers and/or devices may be collected and analyzed according to the DNN that is trained on destructive data and images as previously described.

While optical/PL imaging are disclosed as examples of nondestructive imaging, other nondestructive topography imaging, such as x-ray topography, may be utilized with the same process to provide topography images to the neural network for network training. In this regard, embodiments are disclosed that provide a way to monitor the correctness of counting methods based on synchrotron accepted standards and expertise. Embodiments as disclosed herein may also be configured as a tool that provides accepted counting methodology and defect characterization for SiC wafers.

Figure 8:
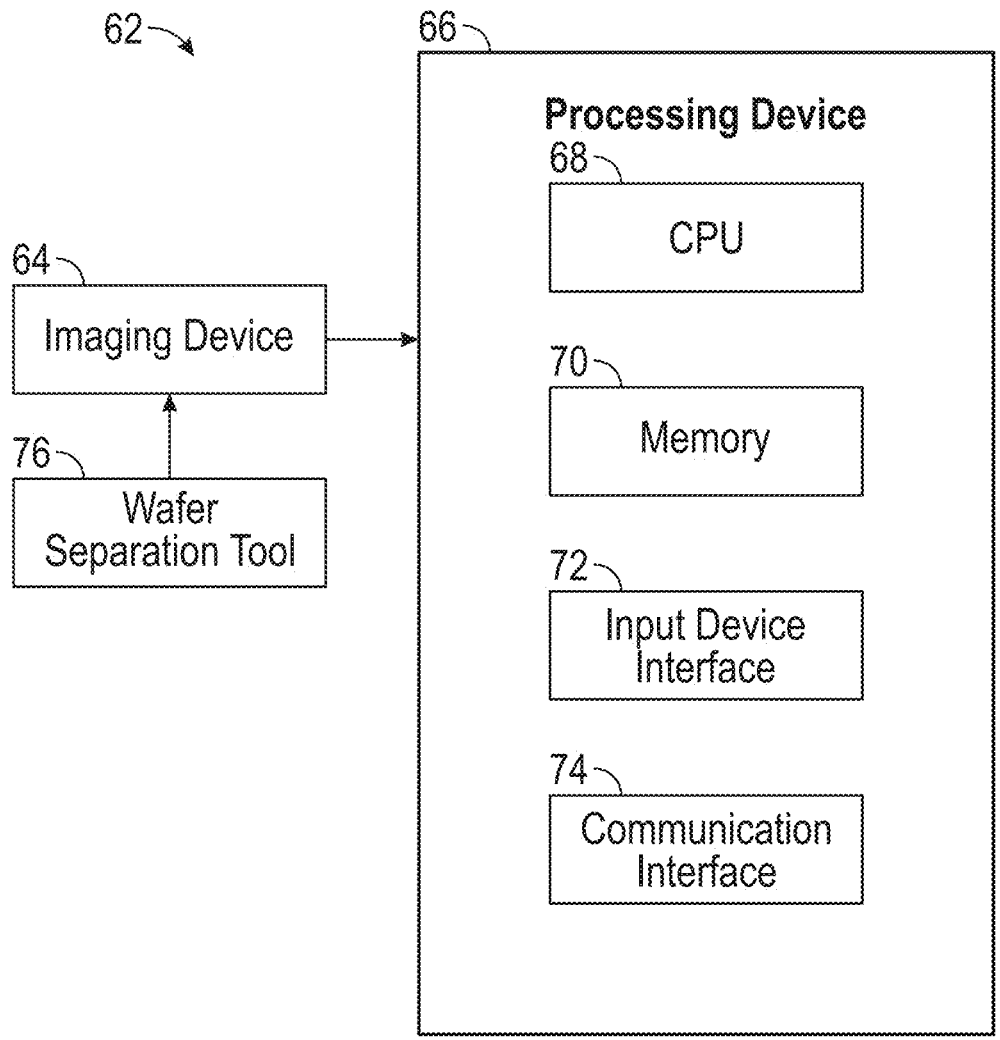
FIG. 8 is a schematic illustration of an exemplary characterization system according to embodiments disclosed herein.

FIG. 8 is a schematic illustration of an exemplary characterization system 62 according to embodiments disclosed herein. As illustrated, an imaging device 64, such as an automated optical surface and PL microscope, is provided to capture nondestructive images of SiC wafers. The nondestructive images may then be processed by a processing device 66, which may include a central processing unit (CPU) 68 and/or memory 70 configured to analyze the nondestructive images for defect characterization according to a trained DNN as described for FIG. 6. The CPU 68 may comprise multiple cores, multiple nodes, and/or multiple workstations working together. Additionally, a graphics processing unit (GPU), multiple GPUs, and/or multiple GPUs on different work stations may be used with CPU 68 to more rapidly process information. In certain embodiments, the nondestructive images may be stored separately from the processing device 66. For example, the nondestructive images may be stored on a server from which the processing device 66 has access to. In other embodiments, one or more of the nondestructive images may be stored directly in the processing device 66. The processing device 66 and/or the CPU 68 may comprise any computing or electronic device capable of including firmware, hardware, and/or executing software instructions to implement the functionality described herein, such as a computer server, a desktop computing device, a laptop computing device, a smartphone, a computing tablet, or the like. The memory 70 may include non-volatile memory and volatile memory. The non-volatile memory may include read-only memory (ROM), erasable programmable read-only memory (EPROM), electrically erasable programmable read-only memory (EEPROM), and the like. The volatile memory generally includes random-access memory (RAM). A basic input/output system (BIOS) may be stored in the non-volatile memory and can include the basic routines that help to transfer information between elements within the processing device 66.

The processing device 66 may further include or be coupled to a non-transitory computer-readable storage medium, such as a storage device, which may represent an internal or external hard disk drive (HDD), flash memory, or the like. The storage device and other drives associated with computer-readable media and computer-usable media may provide non-volatile storage of data, data structures, computer-executable instructions, and the like. Although the description of computer-readable media above refers to an HDD, it should be appreciated that other types of media that are readable by a computer, such as optical disks, magnetic cassettes, flash memory cards, cartridges, and the like, may also be used in the operating environment, and, further, that any such media may contain computer-executable instructions for performing novel methods of the disclosed embodiments.

An operating system and any number of applications can be stored in the volatile memory, wherein the applications represent a wide array of computer-executable instructions corresponding to programs, applications, functions, and the like that may implement the functionality of defect characterization as described herein in whole or in part. The applications may also reside on the storage mechanism provided by the storage device. As such, all or a portion of the functionality described herein may be implemented as a computer program product stored on a transitory or non-transitory computer-usable or computer-readable storage medium, such as the storage device, volatile memory, non-volatile memory, and the like. The computer program product includes complex programming instructions, such as complex computer-readable program code, to cause the processing device 66 to carry out the steps necessary to implement the defect characterization functions described herein. The processing device 66 may serve as a controller or control system to implement the functionality described herein based on the computer program product.

An operator, such as a user, may also be able to enter one or more configuration commands through a keyboard, a pointing device such as a mouse, or a touch-sensitive surface, such as a display device, via an input device interface 72 or remotely through a web interface, terminal program, or the like via a communication interface 74. The display device, which is coupled to a system bus, may be driven via a video port. The communication interface 74 may be wired or wireless and facilitate communications with any number of devices via the communication interface 74 in a direct or indirect fashion.

As further illustrated in FIG. 8, the characterization system 62 may optionally be integrated with additional equipment that provide other capabilities related to crystalline wafer manufacturing. For example, the additional equipment may include a wafer separation tool 76 that is configured to separate one or more crystalline wafers from a bulk crystalline material (e.g., SiC wafers from a SiC boule). In this manner, each crystalline wafer may be analyzed for defects according to embodiments disclosed herein right after separation. In certain embodiments, the wafer separation tool 76 comprises a wire saw tool or a laser-assisted separation tool. The wafer separation tool 76 may be built-in with one or more of the imaging device 64 and the processing device 66.

According to aspects disclosed herein, nondestructive, fast and accurate extended defect characterization for crystalline wafers, such as large diameter SiC wafers, is provided. Nondestructive PL image signals from extended defects on 4H-SiC wafers may be correlated to specific etch features of basal plane dislocations, threading screw dislocations, and threading edge dislocations, among others for development of one or more neural networks, such as a DCNNs. To train and develop DCNNs, large volume data sets may be used from selective etch methods of 4H-SiC wafers as correlated with established techniques such as SXRT. Once sufficient training is complete, destructive methods may no longer be needed to characterize extended defects in 4H-SiC wafers. In certain aspects, using nondestructive images of unetched wafers coupled with automatically labelled images of the corresponding etched wafers, DCNNs may be trained to infer the position of the defects only from the nondestructive images, regardless of the wafer face that is imaged.

Techniques described herein may also be applied for analyzing or characterizing wafers that include one or more epitaxial layers or devices formed thereon. To train a DNN in this manner, one or more characteristics of epitaxial layers or devices formed on a wafer may be correlated with nondestructive data and images captured from the wafer before the epitaxial layers or devices are formed. With enough training, one or more characteristics of epitaxial layers or devices may be inferred from nondestructive data and images of bare wafers, thereby providing predictive information useful for selecting certain wafers for specific applications.

Figure 9:
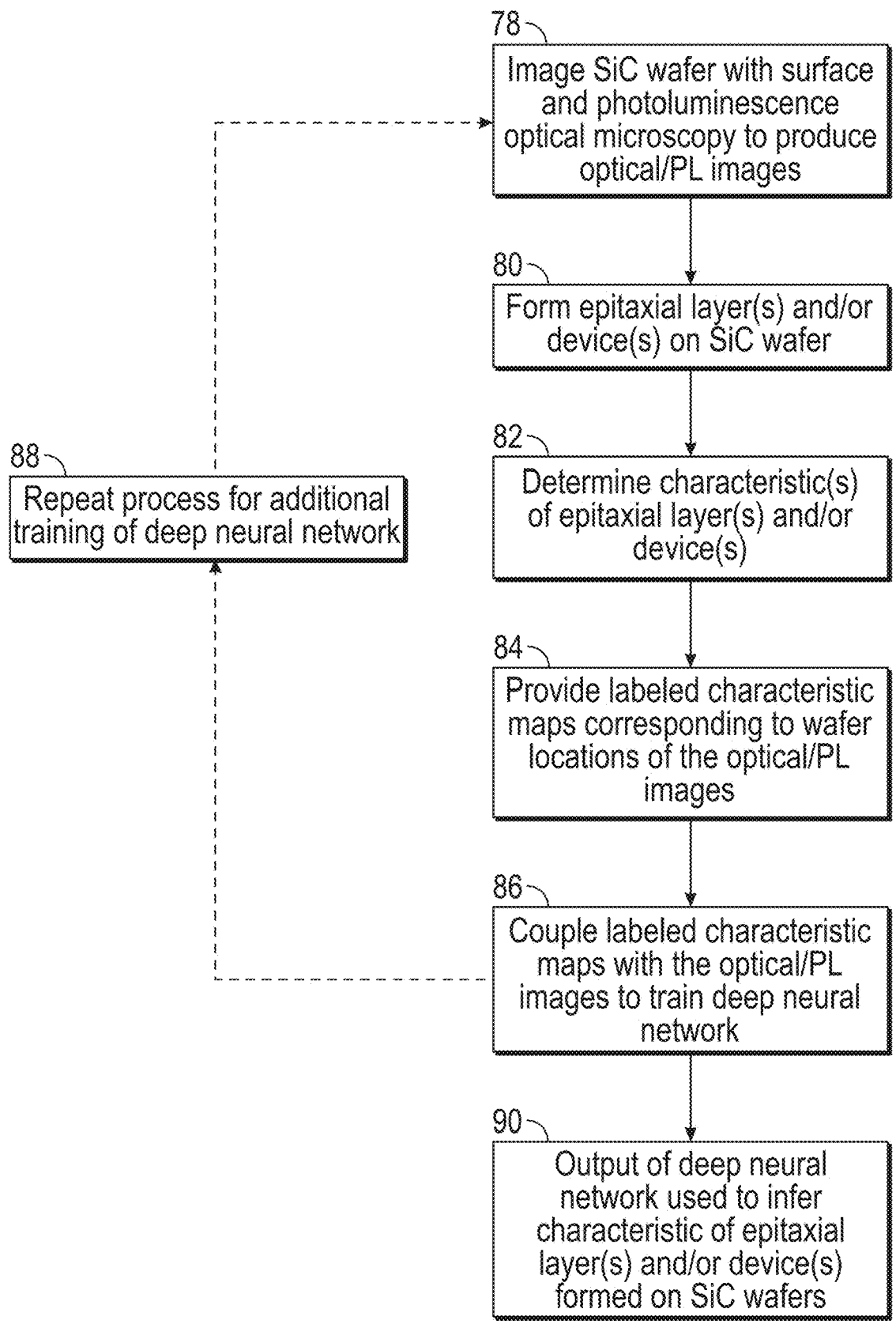
FIG. 9 represents a schematic process flow for training and development of a DNN to infer characteristics of epitaxial layers and/or devices by analyzing nondestructive data of bare SiC wafers.

FIG. 9 represents a schematic process flow for training and development of a DNN to infer characteristics of epitaxial layers and/or devices by analyzing nondestructive data of bare SiC wafers. In a first step 78, a SiC wafer is nondestructively imaged with surface and PL optical microscopy to produce one or more optical/PL images that correspond with certain wafer locations. For an entire surface of a SiC wafer, a plurality of optical/PL images may be captured. In certain embodiments, one or both of the Si-face and the C-face of the SiC wafer may be imaged. In other embodiments, the first step 78 may include capturing other nondestructive data in addition to or in place of the optical/PL images. In a second step 80, one or more epitaxial layers and/or one or more devices are formed on the SiC wafer. In a third step 82, one or more characteristics of the epitaxial layers and/or devices are determined. In certain embodiments, the one or more characteristics may include capturing optical/PL images of the epitaxial layers and/or devices to provide one or more of a defect profile, crystalline structure, bandgap, impurity level, and uniformity measurements, among others. The one or more characteristics may also include determining other characteristics of the epitaxial layers and/or devices such as resistivity and mobility measurements. In a fourth step 84, the one or more characteristics are used to form labeled characteristic images or maps corresponding to the various wafer locations of the optical/PL images provided in the first step 78. In a fifth step 86, the labeled characteristic images or maps are coupled and provided to train the DNN. As indicated by an optional step 88, the process may be repeated for multiple SiC wafers for additional training of the DNN. In step 90, the output of the DNN, as trained by the preceding steps, may be subsequently used to infer characteristics of epitaxial layers and/or devices by analyzing nondestructive data of bare SiC wafers. Further discussion of characterization techniques that include analyzing nondestructive images with a DCNN that has been trained for defect identification is set out in U.S. patent application Ser. No. 16/750,358, filed Jan. 23, 2020, entitled "NONDESTRUCTIVE CHARACTERIZATION FOR CRYSTALLINE WAFERS," with the entire contents thereof being hereby incorporated by reference herein.

It is contemplated that any of the foregoing aspects, and/or various separate aspects and features as described herein, may be combined for additional advantage. Any of the various embodiments as disclosed herein may be combined with one or more other disclosed embodiments unless indicated to the contrary herein.

Those skilled in the art will recognize improvements and modifications to the preferred embodiments of the present disclosure. All such improvements and modifications are considered within the scope of the concepts disclosed herein and the claims that follow.

What is claimed is:

1. A method of aligning wafer images comprising:
accessing a first wafer image and a second wafer image;
identifying a plurality of common crystalline features that is present in both the first wafer image and the second wafer image;
assigning a first coordinate position for each common crystalline feature of the plurality of common crystalline features in the first wafer image;
assigning a second coordinate position for each common crystalline feature of the plurality of common crystalline features in the second wafer image; and
aligning the first wafer image with the second wafer image so that the first coordinate position and the second coordinate position for each common crystalline feature of the plurality of common crystalline features are positioned less than or equal to 15 microns (μm) from each other, wherein aligning the first wafer image and the second wafer image comprises determining a transformation matrix based on differences in coordinate positions between the first coordinate position and the second coordinate position for each common crystalline feature of the plurality of common crystalline features.

2. The method of claim 1, wherein the first coordinate position and the second coordinate position for each common crystalline feature of the plurality of common crystalline features are positioned less than or equal to 10 μm from each other.

3. The method of claim 1, wherein the first coordinate position and the second coordinate position for each common crystalline feature of the plurality of common crystalline features are positioned less than or equal to 3 μm from each other.

4. The method of claim 1, wherein the first coordinate position and the second coordinate position for each common crystalline feature of the plurality of common crystalline features are positioned in a range from 1 μm to 15 μm from each another.

5. The method of claim 1, further comprising applying the transformation matrix to the first coordinate position to provide a transformed first coordinate position for each common crystalline feature of the plurality of common crystalline features.

6. The method of claim 5, further comprising training a deep neural network based on the transformed first coordinate position relative to the second coordinate position.

7. The method of claim 1, wherein the first wafer image and the second wafer image are captured from a same crystalline wafer.

8. The method of claim 7, wherein the same crystalline wafer comprises a silicon carbide (SiC) wafer.

9. The method of claim 8, wherein the first wafer image is captured from a silicon face of the SiC wafer and the second wafer image is captured from a carbon face of the SiC wafer.

10. The method of claim 8, wherein the plurality of common crystalline features comprises at least one of micropipes, threading edge dislocations, threading screw dislocations, basal plane dislocations, hexagonal voids, or stacking faults.

11. The method of claim 1, wherein the first wafer image and the second wafer image are taken from different wafers that were formed from a same crystalline boule.

12. The method of claim 11, wherein the same crystalline boule comprises silicon carbide (SiC).

13. The method of claim 1, wherein the first wafer image comprises one of a photoluminescence (PL) image, an optical microscopy image, a cross-polarized light image, or an x-ray topography image.

14. The method of claim 13, wherein the second wafer image comprises one of a PL image, an optical microscopy image, a cross-polarized light image, or an x-ray topography image that is different than the first wafer image.

15. The method of claim 1, wherein the first wafer image is a nondestructive image and the second wafer image is a destructive image.

16. The method of claim 1, wherein the first wafer image is a nondestructive image and the second wafer image is a nondestructive image.

17. The method of claim 1, wherein the first wafer image is a destructive image and the second wafer image is a destructive image.

18. The method of claim 1, wherein at least one of the first wafer image and the second wafer image comprises spatially correlated data that is provided by one or more of a model, simulation, or mathematical calculation.

19. A method of aligning wafer images comprising:
accessing a first wafer image and a second wafer image;
identifying a plurality of common crystalline features that is present in both the first wafer image and the second wafer image, wherein the plurality of common crystalline features comprises at least one of micropipes, threading edge dislocations, threading screw dislocations, basal plane dislocations, hexagonal voids, or stacking faults;
assigning a first pixel group for each common crystalline feature of the plurality of common crystalline features in the first wafer image, wherein each individual pixel of the first pixel group includes at least a portion of a common crystalline feature of the plurality of crystalline features in the first wafer image;
assigning a second pixel group for each common crystalline feature of the plurality of common crystalline features in the second wafer image, wherein each individual pixel of the second pixel group includes at least a portion of a common crystalline feature of the plurality of crystalline features in the second wafer image; and
aligning the first wafer image with the second wafer image so that the first pixel group at least partially overlaps with the second pixel group for each common crystalline feature of the plurality of common crystalline features.

20. The method of claim 19, wherein each common crystalline feature of the plurality of common crystalline features comprises a width of less than or equal to 25 microns ($\mu m$).

21. The method of claim 20, wherein the width is less than or equal to 10 $\mu m$.

22. The method of claim 20, wherein the width is less than or equal to 3 $\mu m$.

23. The method of claim 20, wherein the width is in a range from 1 $\mu m$ to 25 $\mu m$.

24. The method of claim 19, wherein a pixel size of each individual pixel in the first pixel group is in a range from 3 microns ($\mu m$) to 10 $\mu m$.

25. The method of claim 19, further comprising:
identifying a first subsection of the first wafer image and a second subsection of the second wafer image that both comprise a first common crystalline feature of the plurality of common crystalline features;
assigning a first coordinate position of the first common crystalline feature in the first subsection; and
assigning a second coordinate position of the first common crystalline feature in the second subsection.

26. The method of claim 25, further comprising transforming the first coordinate position to correspond with the second coordinate position.

27. The method of claim 19, further comprising:
identifying a plurality of first subsections of the first wafer image and a plurality of second subsections of the second wafer image;
grouping the plurality of first subsections and the plurality of second subsections into a plurality of subsection pairs, wherein each subsection pair comprises an individual first subsection of the plurality of first subsections, an individual second subsection of the plurality of second subsections, and at least one common crystalline feature of the plurality of common crystalline features; and
determining a transformation matrix based on differences in coordinate positions for the at least one common crystalline feature within each subsection pair of the plurality of subsection pairs.

28. The method of claim 27, further comprising applying the transformation matrix so that the at least one common crystalline feature within each subsection pair is at least partially aligned.

29. The method of claim 28, further comprising providing a combined wafer image based on where the first wafer image is at least partially aligned with the second wafer image based on the transformation matrix.

30. The method of claim 28, further comprising providing the combined wafer image to a deep neural network.

31. The method of claim 19, wherein the first wafer image and the second wafer image are captured from either a same crystalline wafer or from different wafers that were formed from a same crystalline boule.

32. The method of claim 31, wherein the same crystalline wafer or the same crystalline boule comprises silicon carbide (SiC).

33. The method of claim 19, wherein the first wafer image is captured from a silicon face of a first silicon carbide (SiC) wafer and the second wafer image is captured from a carbon face of the first SiC wafer or a carbon face of a second SiC wafer formed from a same crystalline boule as the first SiC wafer.

34. The method of claim 19, wherein the first wafer image comprises one of a photoluminescence (PL) image, an optical microscopy image, a cross-polarized light image, or an x-ray topography image.

35. The method of claim 34, wherein the second wafer image comprises one of a PL image, an optical microscopy image, a cross-polarized light image, or an x-ray topography image that is different than the first wafer image.

36. The method of claim 19, wherein the first wafer image is a nondestructive image and the second wafer image is a destructive image.

37. The method of claim 19, wherein the first wafer image is a destructive image and the second wafer image is a destructive image.

38. The method of claim 19, wherein the first wafer image is an unetched wafer image and the second wafer image is an etched wafer image.

39. A method of aligning wafer images comprising:
accessing a first wafer image and a second wafer image, wherein the first wafer image is captured from a first face of a wafer and the second wafer image is captured from a second face of the wafer;
identifying a plurality of common crystalline features that is present in both the first wafer image and the second wafer image;
assigning a first coordinate position for each common crystalline feature of the plurality of common crystalline features in the first wafer image;

assigning a second coordinate position for each common crystalline feature of the plurality of common crystalline features in the second wafer image; and aligning the first wafer image with the second wafer image so that the first coordinate position and the second coordinate position for each common crystalline feature of the plurality of common crystalline features are positioned less than or equal to 15 microns (μm) from each other; wherein the wafer is a silicon carbide (SiC) wafer and the first face is a silicon face of the SiC wafer and second face is a carbon face of the SiC wafer.

40. A method of aligning wafer images comprising:

accessing a first wafer image and a second wafer image, wherein the first wafer image and the second wafer image are taken from different wafers formed from a same crystalline boule;

identifying a plurality of common crystalline features that is present in both the first wafer image and the second wafer image;

assigning a first coordinate position for each common crystalline feature of the plurality of common crystalline features in the first wafer image;

assigning a second coordinate position for each common crystalline feature of the plurality of common crystalline features in the second wafer image; and aligning the first wafer image with the second wafer image so that the first coordinate position and the second coordinate position for each common crystalline feature of the plurality of common crystalline features are positioned less than or equal to 15 microns (μm) from each other.

41. A method of aligning wafer images comprising:

accessing a first wafer image and a second wafer image, wherein the first wafer image is an unetched wafer image and the second wafer image is an etched wafer image;

identifying a plurality of common crystalline features that is present in both the first wafer image and the second wafer image;

assigning a first coordinate position for each common crystalline feature of the plurality of common crystalline features in the first wafer image;

assigning a second coordinate position for each common crystalline feature of the plurality of common crystalline features in the second wafer image; and aligning the first wafer image with the second wafer image based on each common crystalline feature of the plurality of common crystalline features; wherein the first wafer image is captured from a first face of a wafer and the second wafer image is captured from a second face of the wafer.

42. The method of claim 41, wherein the wafer is a silicon carbide (SiC) wafer and the first face is a silicon face of the SiC wafer and the second face is a carbon face of the SiC wafer.

* * * * *

UNITED STATES PATENT AND TRADEMARK OFFICE
CERTIFICATE OF CORRECTION

PATENT NO. : 11,361,454 B2
APPLICATION NO. : 16/804776
DATED : June 14, 2022
INVENTOR(S) : Robert Tyler Leonard et al.

It is certified that error appears in the above-identified patent and that said Letters Patent is hereby corrected as shown below:

In the Specification

Column 12, Lines 61-62, replace "the second wafer image of FIG. 1B" with --the second wafer image 20 of FIG. 1B--.
Column 14, Line 67, replace "(e.g., depth<μm)" with --(e.g., depth <10 μm)--.

In the Claims

Claim 30, Column 24, Line 25, replace "The method of claim 28" with --The method of claim 29--.

Signed and Sealed this
Twenty-sixth Day of July, 2022

Katherine Kelly Vidal
*Director of the United States Patent and Trademark Office*